US012459250B2

(12) United States Patent

Miyazawa

(10) Patent No.: US 12,459,250 B2
(45) Date of Patent: Nov. 4, 2025

(54) LIQUID EJECTION APPARATUS AND HEAD UNIT

(71) Applicant: SEIKO EPSON CORPORATION, Tokyo (JP)

(72) Inventor: Makoto Miyazawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 327 days.

(21) Appl. No.: 18/170,609

(22) Filed: Feb. 17, 2023

(65) Prior Publication Data

US 2023/0264471 A1 Aug. 24, 2023

(30) Foreign Application Priority Data

Feb. 21, 2022 (JP) ................................ 2022-024406

(51) Int. Cl.
*B41J 2/045* (2006.01)

(52) U.S. Cl.
CPC ....... *B41J 2/04541* (2013.01); *B41J 2/04581* (2013.01)

(58) Field of Classification Search
CPC ................ B41J 2/04581; B41J 2/04541; B41J 2/04588; B41J 2/04593; B41J 2/04596; B41J 2002/14491; B41J 2/14233; B41J 2202/20; B41J 2002/14362; B41J 2/0451; B41J 2/14201; B41J 2202/19
See application file for complete search history.

(56) References Cited

U.S. PATENT DOCUMENTS

2020/0238687 A1 7/2020 Kamijima et al.

FOREIGN PATENT DOCUMENTS

JP 2020-116842 A 8/2020

*Primary Examiner* — Jannelle M Lebron
(74) *Attorney, Agent, or Firm* — Global IP Counselors, LLP

(57) ABSTRACT

A liquid ejection apparatus includes an ejection head including a drive element driven by a drive signal and ejecting a liquid by driving the drive element, an ejection control circuit including a drive circuit that outputs the drive signal based on a base drive signal including a plurality of pieces of drive data, a main control circuit that outputs an ejection control signal including the base drive signal to the ejection control circuit, and a cable that communicably couples the ejection control circuit and the main control circuit and through which the ejection control signal propagates, wherein the ejection control signal includes the base drive signal and a determination signal corresponding to the base drive signal.

15 Claims, 14 Drawing Sheets

| [SIH, SIL] | | [1, 1] LD | [1, 0] MD | [0, 1] SD | [0, 0] ND |
|---|---|---|---|---|---|
| S1 | T1 | H | H | H | L |
| | T2 | H | L | L | L |
| S2 | T1 | L | L | L | H |
| | T2 | L | H | L | L |

LIQUID EJECTION APPARATUS AND HEAD UNIT

The present application is based on, and claims priority from JP Application Serial Number 2022-024406, filed Feb. 21, 2022, the disclosure of which is hereby incorporated by reference herein in its entirety.

BACKGROUND

1. Technical Field

The present disclosure relates to a liquid ejection apparatus and a head unit.

2. Related Art

In an ink jet printer, which is an example of a liquid ejection apparatus, a technique in which a control signal generated by a control circuit or the like provided in an ink jet printer main body is propagated to a print head including nozzles through which the ink is ejected, and the print head controls the ink ejection timing based on an input control signal to print an image, a document, or the like on a medium is known.

For example, JP-A-2020-116842 discloses a liquid ejection apparatus in which a head control unit provided in a main body of a liquid ejection apparatus performs a signal process on an image signal input from an external device to output the processed signal to the head unit, and the head unit generates a drive signal for ejecting the ink from a nozzle and a control signal for controlling the ejection of the ink from the nozzle based on the signal input from the head control unit, so that the waveform of a drive signal for ejecting the ink from the nozzle is less likely to be distorted, and the ink ejection characteristics are improved.

However, from the viewpoint of further improving the ejection characteristics of the liquid to be ejected from the head unit, the technique described in JP-A-2020-116842 is not sufficient, and there is room for further improvement.

SUMMARY

According to an aspect of the present disclosure, a liquid ejection apparatus includes an ejection head including a drive element driven by a drive signal and ejecting a liquid by driving the drive element, an ejection control circuit including a drive circuit that outputs the drive signal based on a base drive signal including a plurality of pieces of drive data, a main control circuit that outputs an ejection control signal including the base drive signal to the ejection control circuit, and a cable that communicably couples the ejection control circuit and the main control circuit and through which the ejection control signal propagates, wherein the ejection control signal includes the base drive signal and a determination signal corresponding to the base drive signal.

According to another aspect of the present disclosure, a head unit includes an ejection head including a drive element driven by a drive signal and ejecting a liquid by driving the drive element, and an ejection control circuit including a drive circuit that outputs the drive signal based on a base drive signal including a plurality of pieces of drive data and to which an ejection control signal including the base drive signal is input, wherein the ejection control signal includes the base drive signal and a determination signal corresponding to the base drive signal.

DESCRIPTION OF EXEMPLARY EMBODIMENTS

Hereinafter, preferred embodiments of the present disclosure will be described with reference to the drawings. The drawings used are for convenience of explanation. The embodiments described below do not unduly limit the details of the present disclosure described in the claims. In addition, all of the configurations described below are not necessarily essential components of the disclosure.

1. Structure of Liquid Ejection Apparatus

Figure 1:
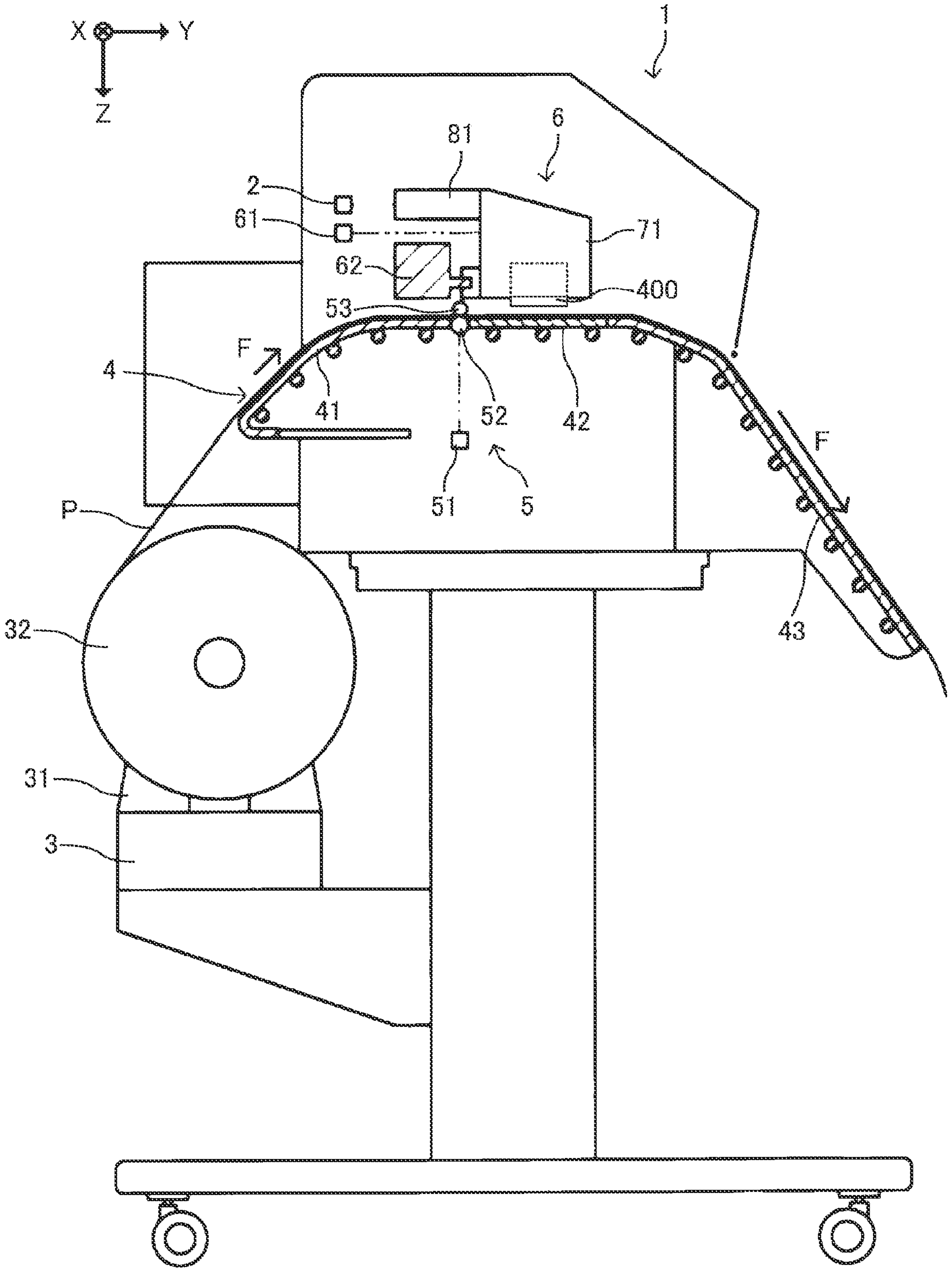
FIG. 1 is a side view illustrating the structure of a liquid ejection apparatus.

The structure of a liquid ejection apparatus 1 according to the present embodiment will be described with reference to FIGS. 1 to 4. FIG. 1 is a side view illustrating the structure of the liquid ejection apparatus 1 As illustrated in FIG. 1, the liquid ejection apparatus 1 includes a controller 2, a feed unit 3, a support unit 4, a transport unit 5 and a printing unit 6. Here, in the following description, the width direction of the liquid ejection apparatus 1 is referred to as the X direction, the depth direction of the liquid ejection apparatus 1 is referred to as the Y direction, and the height direction of the liquid ejection apparatus 1 is referred to as the Z direction. The direction in which a medium P is transported in the liquid ejection apparatus 1 may be referred to as a transport direction F. In FIGS. 1 to 4, the description is made with the X direction, Y direction, and Z direction illustrated in the drawings being directions orthogonal to each other, and the transport direction F being a direction crossing the X direction, but the present disclosure is not limited to a configuration when the various components of the liquid ejection apparatus 1 are disposed orthogonally.

The controller 2 is fixed inside the liquid ejection apparatus 1. The controller 2 generates various signals for controlling the liquid ejection apparatus 1 to output the signals to respective components of the liquid ejection apparatus 1 including the feed unit 3, the support unit 4, the transport unit 5 and the printing unit 6. That is, the controller 2 controls respective components of the liquid ejection apparatus 1 including the feed unit 3, the support unit 4, the transport unit 5 and the printing unit 6.

The feed unit 3 includes a holding member 31. The holding member 31 rotatably holds a roll body 32 on which the medium P is wound. The roll body 32 held by the holding member 31 rotates in one direction under the control of the controller 2. The rotation of the roll body 32 unwind the medium P from the roll body 32. Then, the medium P unwound from the roll body 32 is fed to the support unit 4. That is, the feed unit 3 feeds the medium P from the roll body 32 toward the support unit 4.

The support unit 4 includes a support member 41, a support member 42 and a support member 43. The support member 41 guides the medium P fed out from the feed unit 3 toward the support member 42. The support member 42 supports the medium P on which printing is to be performed. The support member 43 guides the printed medium P downstream in the transport direction F. The support member 41, the support member 42, the support member 43 are positioned in this order from upstream to downstream in which the medium P is transported along the transport direction F. That is, the support member 41, the support member 42, and the support member 43 support the medium P and constitute a transport path along which the medium P is transported.

The transport unit 5 transports the medium P along the transport direction F. The transport unit 5 includes a rotation mechanism 51, a transport roller 52 and a driven roller 53. The rotation mechanism 51 includes a motor, a speed reducer, and the like (not illustrated) that rotate under the control of the controller 2. The rotation mechanism 51 applies driving force generated by the rotation of the motor, speed reducer, and the like to the transport roller 52. The transport roller 52 is positioned below the transport path, in the Z direction, along which the medium P is transported, and the driven roller 53 is positioned above the transport path, in the Z direction, along which the medium P is transported. That is, the transport path along which the medium P is transported is positioned between the transport roller 52 and the driven roller 53 in the Z direction. The transport roller 52 and the driven roller 53 pinched the medium P transported along the transport path. When the driving force is applied from the rotation mechanism 51 to the transport roller 52 configured as described above, the transport roller 52 rotates. As a result, the medium P pinched between the transport roller 52 and the driven roller 53 is transported along the transport direction F while being supported on the transport path.

Figure 2:
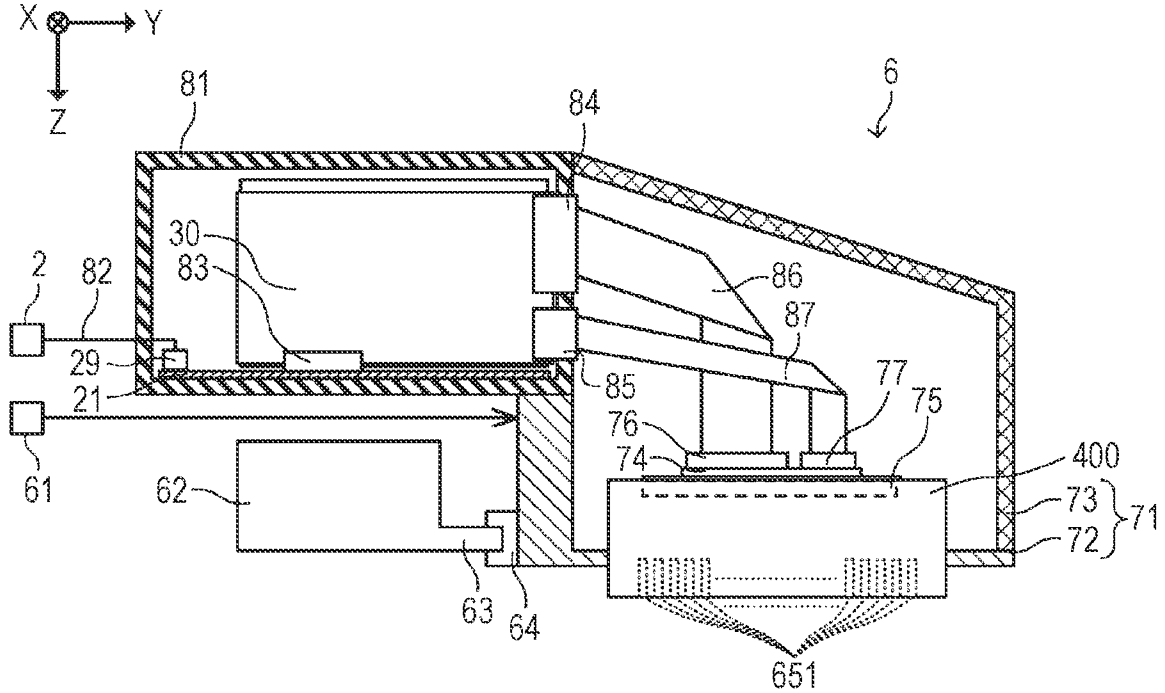
FIG. 2 is a side view illustrating the peripheral structure of a printing unit of the liquid ejection apparatus.
Figure 3:
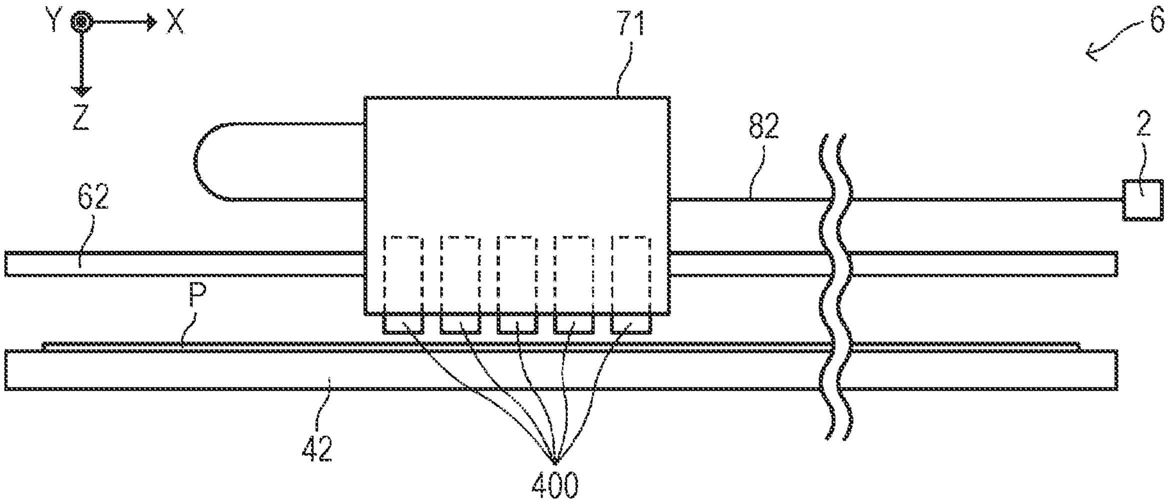
FIG. 3 is a front view illustrating the peripheral structure of the printing unit of the liquid ejection apparatus.
Figure 4:
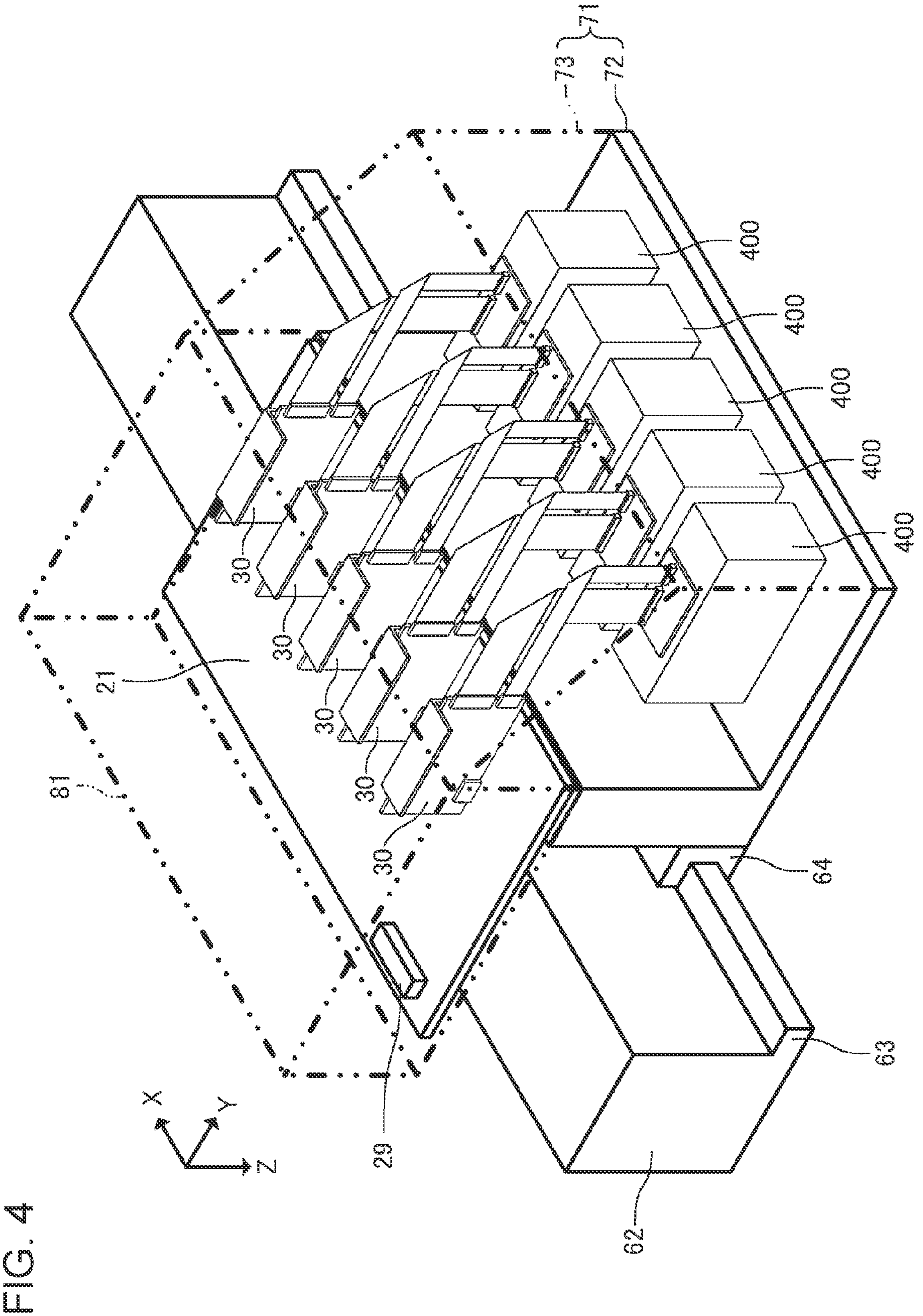
FIG. 4 is a perspective view illustrating the peripheral structure of the printing unit of the liquid ejection apparatus.

The printing unit 6 forms an image on the medium P by ejecting the ink onto the medium P. FIG. 2 is a side view illustrating the peripheral structure of the printing unit 6 of the liquid ejection apparatus 1. FIG. 3 is a front view illustrating the peripheral structure of the printing unit 6 of the liquid ejection apparatus 1. FIG. 4 is a perspective view illustrating the peripheral structure of the printing unit 6 of the liquid ejection apparatus 1. As illustrated in FIGS. 2, 3, and 4, the printing unit 6 has a carriage 71, a heat dissipation case 81, a guide member 62, and a movement mechanism 61.

The carriage 71 includes a carriage body 72 and a carriage cover 73. The carriage body 72 has a substantially L-shaped cross section when viewed in the X direction, and is positioned so that at least a portion of the carriage body 72 faces the medium P. The carriage cover 73 is detachably attached to the carriage body 72. A closed space is formed in the carriage 71 by attaching the carriage cover 73 to the carriage body 72.

Five ejection heads 400 are positioned inside the closed space of the carriage 71. The five ejection heads 400 are disposed at equal intervals in the X direction so that the lower end portions of the five ejection heads 400 are exposed to the outside of the closed space of the carriage 71 from the lower face of the carriage body 72. The lower end portion of the ejection head 400 protruding outside the closed space of the carriage 71 faces the medium P. A plurality of nozzles 651 through which the ink as an example of a liquid is ejected is positioned at the lower end portion of the ejection head 400.

The heat dissipation case 81 accommodates an ejection control circuit board 21 and five drive circuit boards 30. The front end portion of the heat dissipation case 81 is fixed to the upper end portion of the rear portion of the carriage 71. That is, the ejection control circuit board 21 and the five drive circuit boards 30 are mounted on the carriage 71 via the heat dissipation case 81.

A connector 29 is provided on the ejection control circuit board 21. The connector 29 is coupled to one or a plurality of cables 82 for communicably coupling the controller 2 and the ejection control circuit board 21. That is, the cable 82 communicably couples the ejection control circuit board 21 mounted on the carriage 71 that reciprocates in the X direction and the controller 2 fixed to the liquid ejection apparatus 1. That is, the cable 82 deforms as the carriage 71 moves.

Above the ejection control circuit board 21 in the Z direction, the five drive circuit boards 30 are disposed in parallel in the X direction in a state of standing. The five drive circuit boards 30 are communicably coupled to the ejection control circuit board 21 via a connector 83 such as a board to board (BtoB) connector.

Connectors 84 and 85 are provided at the front end portion of each of the five drive circuit boards 30. The connectors 84 and 85 are exposed to the inside of the closed space of the carriage 71 from the front face of the heat dissipation case 81. One end of a cable 86 is coupled to the connector 84 and one end of a cable 87 is coupled to the connector 85. A connection board 74 is provided on the upper face of each of the five ejection heads 400 mounted on the carriage 71. The connection board 74 is electrically coupled to the ejection head 400 via a connector 75 such as a BtoB connector. Connectors 76 and 77 are provided on the connection board 74. The other end of the cable 86 described above is coupled to the connector 76, and the other end of the cable 87 described above is coupled to the connector 77. Thus, the five drive circuit boards 30 and the five ejection heads 400 corresponding to the respective five drive circuit boards 30 are communicably coupled via the respective cables 86 and the respective cables 87.

The guide member 62 extends in the X direction and supports the carriage 71. Specifically, the guide member 62 has a guide rail portion 63 extending in the X direction at the lower front face, and the carriage 71 has a carriage support portion 64 at the lower rear face. The carriage support portion 64 is slidably supported by the guide rail portion 63. This allows the carriage 71 to reciprocate in the X direction with respect to the guide member 62.

The movement mechanism 61 includes a motor (not illustrated) that is driven under the control of the controller 2. The movement mechanism 61 causes the motor to rotate forward and reverse under the control of the controller 2 and converts the rotational force generated in the motor into a moving force of the carriage 71 in the X direction. As a result, the carriage 71 reciprocates in the X direction with the five ejection heads 400, the five drive circuit boards 30, and the ejection control circuit board 21 mounted thereon.

As described above, in the liquid ejection apparatus 1 of the present embodiment, the controller 2 fixed to the main body of the liquid ejection apparatus 1 generates various signals for controlling the operation of the liquid ejection apparatus 1. As a result, the reciprocating movement of the carriage 71 in the X direction is controlled, and the transport of the medium P in the transport direction F is controlled. The controller 2 outputs various signals for ejecting the ink from the ejection head 400 to the ejection control circuit board 21 mounted on the carriage 71 via the cable 82. The ejection control circuit board 21 controls the operation of the drive circuit board 30 and the ejection head 400 mounted on the carriage 71 based on various input signals.

That is, the operations of various components including the ejection control circuit board 21, the drive circuit board 30, and the ejection head 400 mounted on the carriage 71 together with the transport of the medium P in the transport direction F and the movement of the carriage 71 in the X direction are controlled by the controller 2. That is, the controller 2 controls the transport of the medium P in the liquid ejection apparatus 1 in the transport direction F, the movement of the carriage 71 on which the ejection head 400 is mounted in the X direction, and the ejection timing of the ink from the ejection head 400. As a result, the ink ejected by the ejection head 400 is landed on the medium P at a desired position. Therefore, a desired image is formed on the medium P.

FIGS. 1 to 4, the liquid ejection apparatus 1 is described as including the five drive circuit boards 30 and the five ejection heads 400, but the number of the drive circuit boards 30 and the ejection heads 400 included in the liquid ejection apparatus 1 is not limited to five.

2. Functional Configuration of Liquid Ejection Apparatus

Figure 5:
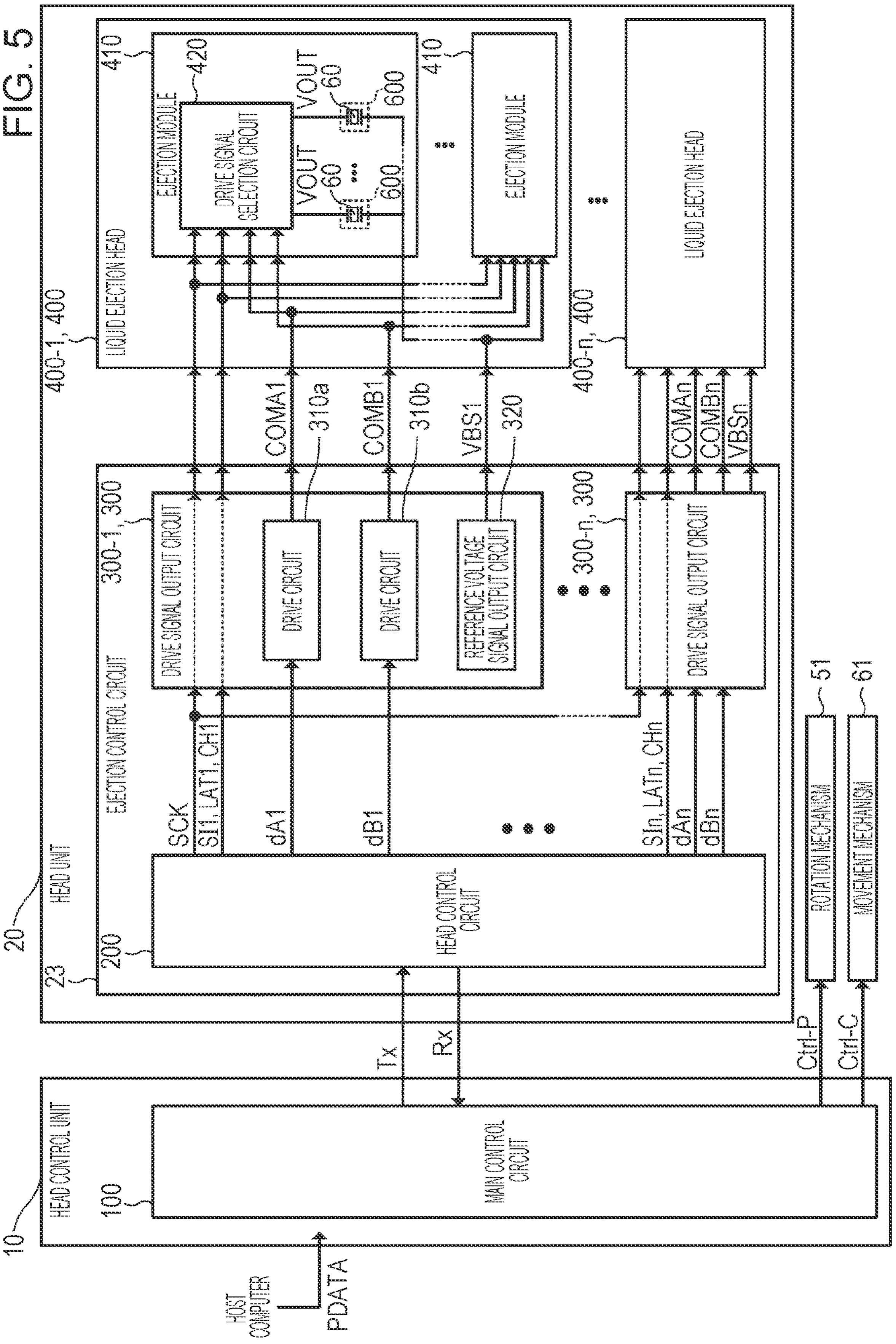
FIG. 5 is a diagram illustrating the functional configuration of the liquid ejection apparatus.

Next, the functional configuration of the liquid ejection apparatus 1 will be described. FIG. 5 is a diagram illustrating the functional configuration of the liquid ejection apparatus 1. As illustrated in FIG. 5, the liquid ejection apparatus 1 includes a head control unit 10 and a head unit 20.

The head control unit 10 includes a main control circuit 100 that constitutes at least part of the controller 2 described above. Such a main control circuit 100 is configured as one or a plurality of integrated circuit (IC) devices including a processor. The head control unit 10 controls the operation of the liquid ejection apparatus 1 including the head unit 20 based on an image signal PDATA input from an external device such as a host computer (not illustrated) provided outside the liquid ejection apparatus 1.

Specifically, the main control circuit 100 generates a transmission signal Tx by performing a predetermined signal process on the image signal PDATA input from an external device (not illustrated). Examples of the signal process performed by the main control circuit 100 on the image signal PDATA include a color conversion process for converting the color tone of image information specified by the image signal PDATA into the color tone of the ink to be ejected by the liquid ejection apparatus 1, a halftone process for generating a signal including information as to whether each pixel is a pixel to which the ink is to be ejected based on the image information based on the image signal PDATA, and the like. Then, the main control circuit 100 outputs the transmission signal Tx generated based on the image signal PDATA to the head unit 20. The signal process performed by the main control circuit 100 is not limited to the color conversion process and the halftone process, but may includes, for example, a nozzle complement process, an interlace process, and the like. Part of the signal process described above may be executed by a head control circuit 200, which will be described later.

The main control circuit 100 generates a control signal Ctrl-P for controlling the transport of the medium P to output the generated control signal to the rotation mechanism 51. The rotation mechanism 51 controls the aforementioned motor and the like according to the input control signal Ctrl-P. As a result, the transport of the medium P by the transport unit 5 is controlled. The main control circuit 100 generates a control signal Ctrl-C for controlling the reciprocating movement of the carriage 71 to output the generated control signal to the movement mechanism 61. The movement mechanism 61 controls the aforementioned motor and the like according to the control signal Ctrl-C. The movement of the carriage 71 is thereby controlled.

The head unit 20 includes an ejection control circuit 23 and n ejection heads 400. The ejection control circuit 23 includes the head control circuit 200 and n drive signal output circuits 300. Here, in the following description, when each of the n drive signal output circuits 300 is distinguished, the n drive signal output circuits 300 may be referred to as drive signal output circuits 300-1 to **300-*n*, and when each of the n ejection heads 400 is distinguished, the n ejection heads 400 may be referred to as ejection heads 400-1 to 400-*n*. The following description is made assuming that the drive signal output circuit 300-*i* (i=any one of 1 to n) and the ejection head 400-*i*** correspond to each other.

The ejection control circuit 23 is provided on the ejection control circuit board 21 described above. The transmission signal Tx output by the main control circuit 100 is input to the ejection control circuit 23. Based on the transmission signal Tx output by the main control circuit 100, the ejection control circuit 23 generates print data signals SI1 to SIn, latch signals LAT1 to LATn, change signals CH1 to CHn, base drive signals dA1 to dAn, dB1 to dBn, and a clock signal SCK to output them to corresponding drive signal output circuits 300-1 to **300-*n***.

The ejection control circuit 23 generates a reception signal Rx including a signal indicating that the transmission signal Tx input from the main control circuit 100 has been received successfully to output the generated reception signal Rx to the main control circuit 100.

Each of the drive signal output circuits 300-1 to **300-*n* is provided on the drive circuit board 30 described above. The drive signal output circuit 300-1 includes drive circuits 310*a* and 310*b* and a reference voltage signal output circuit 320. A base drive signal dA1 is input to the drive circuit 310*a*. Then, the drive circuit 310*a* converts the input base drive signal dA1 into a digital/analog signal, and, then, class-D amplifies the converted analog signal to generate a drive signal COMA1 to output the generated drive signal COMA1 to the ejection head 400-1. Further, a base drive signal dB1 is input to the drive circuit 310*b*. Then, the drive circuit 310*b* converts the input base drive signal dB1 into a digital/analog signal, and, then, class-D amplifies the converted analog signal to generate a drive signal COMB1 to output the generated drive signal COMB1 to the ejection head 400-1**.

The reference voltage signal output circuit 320 generates a reference voltage signal VBS1 that serves as a reference for driving a piezoelectric element 60 (described later) driven based on the drive signals COMA1 and COMB1 to output the generated reference voltage signal VBS1 to the ejection head 400-1. The reference voltage signal VBS1 may be, for example, a DC voltage signal with a constant potential such as a voltage value of 6 V or 5.5 V, or may be a ground potential signal.

The drive signal output circuit 300-1 receives the print data signal SI1, the latch signal LAT1, the change signal CH1, and the clock signal SCK output by the head control circuit 200. The print data signal SI1, the latch signal LAT1, the change signal CH1, and the clock signal SCK propagate through the drive circuit board 30 provided with the drive signal output circuit 300-1 and are input to the ejection head 400-1.

Here, the drive signal output circuits 300-1 to **300-*n* have the same configuration. That is, the base drive signals dAi and dBi are input to the drive signal output circuit 300-*i*. Then, the drive signal output circuit 300-*i* generates the drive signals COMAi, COMBi and a reference voltage signal VBSi to output them to the ejection head 400-*i*. In addition, the print data signal SIi, the latch signal LATi, the change signal CHi, and the clock signal SCK propagate through the drive circuit board 30 provided with the drive signal output circuit 300-*i*. The print data signal SIi, the latch signal LATi, the change signal CHi, and the clock signal SCK that propagated through the drive circuit board 30 provided with the drive signal output circuit 300-*i* are input to the ejection head 400-*i***.

The ejection head 400-1 includes m ejection modules 410. Each of the m ejection modules 410 includes a drive signal selection circuit 420 and p ejection units 600. The drive signal selection circuit 420 included in each of the m ejection modules 410 is configured as an integrated circuit device, for example. That is, the ejection head 400-1 includes m drive signal selection circuits 420 and m×p ejection units 600.

The print data signal SI1, the latch signal LAT1, the change signal CH1, the clock signal SCK, and the drive signals COMA1 and COMB1 are input to each of the m drive signal selection circuits 420 of the ejection head 400-1. The m drive signal selection circuits 420 included in the ejection head 400-1 select or deselect the signal waveforms of the input drive signals COMA1 and COMB1 according to the specification of the print data signal SI1 at the timing specified by the latch signal LAT1 and the change signal CH1 to generate the drive signal VOUT. The drive signal VOUT generated by the m drive signal selection circuits 420 of the ejection head 400-1 is supplied to one end of the piezoelectric element 60 of the corresponding ejection unit 600.

At this time, the reference voltage signal VBS1 is supplied to the other ends of the m×p piezoelectric elements 60 of the ejection head 400-1. The piezoelectric elements 60 of the m×p ejection units 600 of the ejection head 400-1 are driven based on the potential difference between the drive signal VOUT based on the drive signals COMA1 and COMB1 and the reference voltage signal VBS1. As a result, an amount of the ink corresponding to the driving of the piezoelectric element 60 is ejected from the corresponding ejection unit 600.

Here, all of the ejection heads 400-1 to **400-*n* have the same configuration. That is, the print data signal SIi, the latch signal LATi, the change signal CHi, the clock signal SCK, and the drive signals COMAi and COMBi are input to the ejection head 400-*i*, and each of the m drive signal selection circuits 420 of the ejection head 400-*i* generates the drive signal VOUT based on the drive signals COMAi and COMBi. The drive signal VOUT generated by each of the m drive signal selection circuits 420 of the ejection head 400-*i* is supplied to one end of the corresponding piezoelectric element 60 included in the ejection head 400-*i*. At this time, the reference voltage signal VBSi is supplied to the other end of the corresponding piezoelectric element 60 included in the ejection head 400-*i*. Therefore, the piezoelectric element 60 included in each of the m ejection modules 410 included in the ejection head 400-*i* is driven according to the potential difference between the drive signal VOUT based on the drive signals COMAi and COMBi and the reference voltage signal VBSi. As a result, the m×p ejection units 600 included in the m ejection modules 410 included in the ejection head 400-*i* eject the ink in an amount corresponding to the driving of the piezoelectric element 60**.

3. Configuration and Operation of Ejection Head

Next, the configuration and operation of the ejection head 400 will be described. In the following description, the description is made assuming that the ejection head 400 receives the print data signals SI as the print data signals SI1 to SIn, the latch signals LAT as the latch signals LAT1 to LATn, the change signals CH as the change signals CH1 to CHn, the clock signal SCK, the drive signals COMA as the drive signals COMA1 to COMBn, the drive signals COMB as the drive signals COMB1 to COMBn, and the reference voltage signals VBS as the reference voltage signals VBS1 to VBSn.

Figure 6:
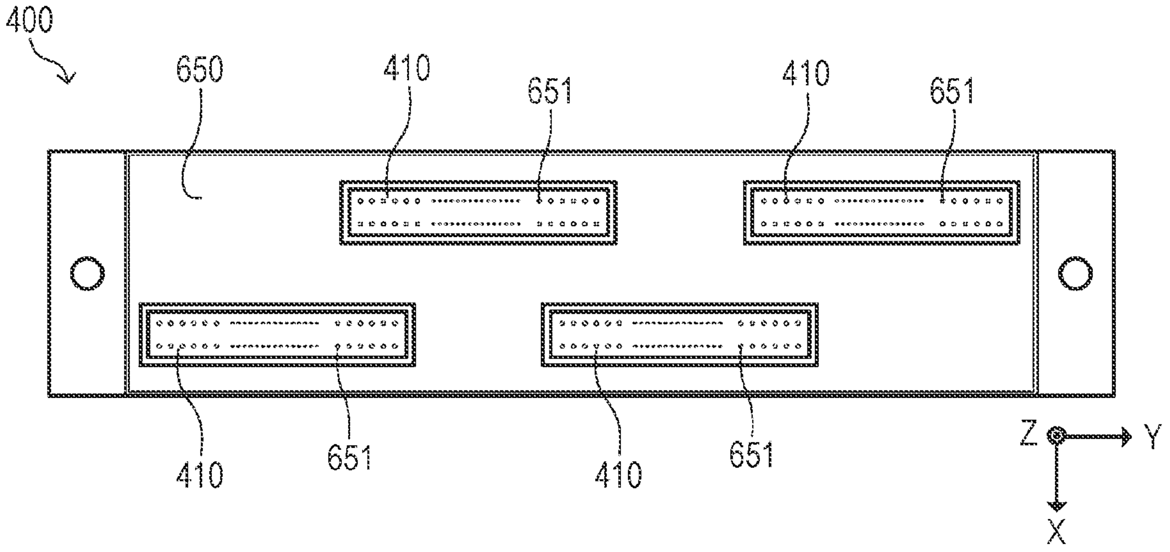
FIG. 6 is a diagram illustrating the configuration of an ink ejection face.

FIG. 6 is a diagram illustrating the configuration of an ink ejection face 650, of the ejection head 400, on which a plurality of nozzles 651 through which the ink is ejected is provided. As illustrated in FIG. 6, the ejection head 400 includes the four ejection modules 410 disposed in a zigzag pattern. Each of the four ejection modules 410 includes p nozzles 651 disposed in two rows along the Y direction. That is, 4×p nozzles 651 are provided on the ink ejection face 650 of the ejection head 400. The ejection head 400 is positioned to face the medium P with the ink ejection face 650 protruding below the carriage 71. Note that the number of the ejection modules 410 included in the ejection head 400 is not limited to four.

Figure 7:
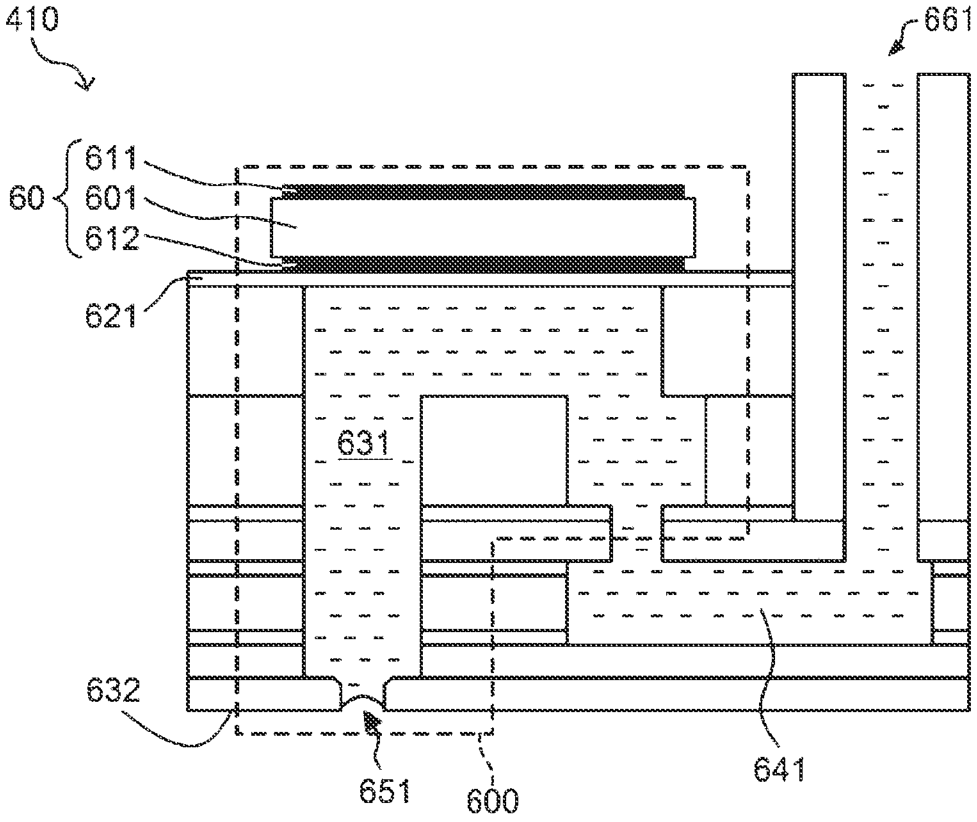
FIG. 7 is a diagram illustrating the schematic configuration of an ejection unit.

Next, the structure of the p ejection units 600 included in the ejection module 410 will be described. FIG. 7 is a diagram illustrating a schematic configuration of the ejection unit 600. Note that FIG. 7 illustrates a reservoir 641 and an ink supply port 661 in addition to the ejection unit 600.

As illustrated in FIG. 7, the ejection unit 600 includes the piezoelectric element 60, a vibration plate 621, a cavity 631 and the nozzle 651. The vibration plate 621 is displaced as the piezoelectric element 60 provided on the upper face in FIG. 7 is driven. The vibration plate 621 functions as a diaphragm that expands/contracts the internal volume of the cavity 631. The inside of the cavity 631 is filled with the ink. The cavity 631 functions as a pressure chamber whose internal volume changes due to displacement of the vibration plate 621 due to driving of the piezoelectric element 60. The nozzle 651 is an opening formed in the nozzle plate 632 and communicating with the cavity 631. As the internal volume of the cavity 631 changes, the ink stored inside the cavity 631 is ejected from the nozzle 651.

The piezoelectric element 60 has a structure in which a piezoelectric body 601 is sandwiched between a pair of electrodes 611 and 612. In the piezoelectric body 601 having this structure, the central portions of the electrodes 611 and 612 and the vibration plate 621 bend vertically in FIG. 7 with respect to the both end portions according to the potential difference between the electrode 611 and the electrode 612. Specifically, the drive signal VOUT is supplied to the electrode 611 at one end of the piezoelectric element 60, and the reference voltage signal VBS is supplied to the electrode 612 at the other end. When the piezoelectric element 60 bends upward according to the voltage value of the drive signal VOUT, the vibration plate 621 is displaced upward, and as a result, the internal volume of the cavity 631 expands. Therefore, the ink stored in the reservoir 641 is drawn into the cavity 631. On the other hand, when the piezoelectric element 60 bends downward according to the voltage value of the drive signal VOUT, the vibration plate 621 is displaced downward, and as a result, the internal volume of the cavity 631 is reduced. Therefore, an amount of the ink is ejected from the nozzle 651 according to the degree of reduction of the internal volume of the cavity 631. As described above, the ejection head 400 includes the piezoelectric element 60 and ejects the ink onto the medium by driving the piezoelectric element 60. The structure of the piezoelectric element 60 is not limited to the illustrated one, but may be of any type as long as it is capable of ejecting the ink as the piezoelectric element 60 is displaced.

Here, an example of waveforms of the drive signals COMA and COMB, which are the basis of the drive signal VOUT supplied to the electrode 611 of the piezoelectric element 60, and an example of the waveform of the drive signal VOUT will be described.

Figure 8:
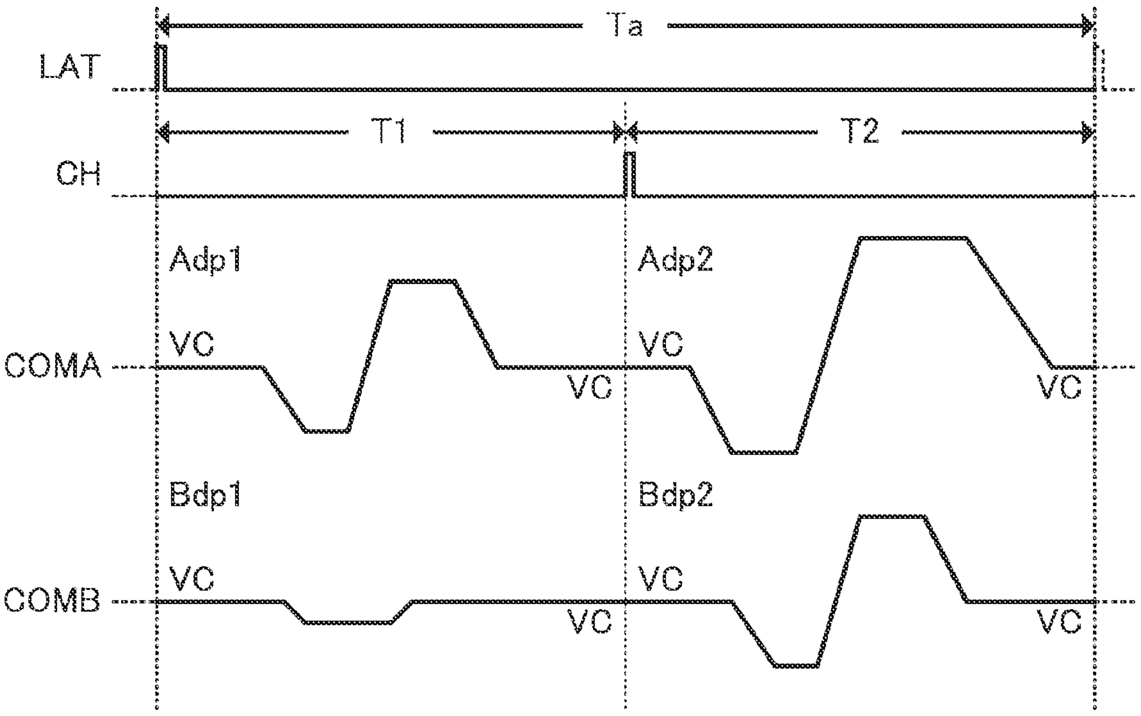
FIG. 8 is a diagram illustrating an example of signal waveforms of drive signals COMA and COMB.

FIG. 8 is a diagram illustrating an example of signal waveforms of drive signals COMA and COMB. As illustrated in FIG. 8, the drive signal COMA is a signal waveform in which a trapezoidal waveform Adp1 disposed in a period T1 from the rise of the latch signal LAT to the rise of the change signal CH, and a trapezoidal waveform Adp2 disposed in a period T2 from the rise of the change signal CH to the rise of the latch signal LAT are made to be continuous. When the trapezoidal waveform Adp1 is supplied to one end of the piezoelectric element 60, a predetermined amount of the ink is ejected from the ejection unit 600 corresponding to the piezoelectric element 60, and when the trapezoidal waveform Adp2 is supplied to one end of the piezoelectric element 60, an amount of the ink larger than the predetermined amount is ejected from the ejection unit 600 corresponding to the piezoelectric element 60.

Further, the drive signal COMB is a signal waveform in which a trapezoidal waveform Bdp1 disposed in the period T1 and a trapezoidal waveform Bdp2 disposed in the period T2 are made to be continuous. When the trapezoidal waveform Bdp1 is supplied to one end of the piezoelectric element 60, no ink is ejected from the ejection unit 600 corresponding to the piezoelectric element 60. At this time, the ejection unit 600 vibrates the ink near the opening of the nozzle 651 to prevent an increase in ink viscosity. Also, when the trapezoidal waveform Bdp2 is supplied to one end of the piezoelectric element 60, a predetermined amount of the ink is ejected from the ejection unit 600 corresponding to the piezoelectric element 60, as in when the trapezoidal waveform Adp1 is supplied.

Here, in the following description, the ejection amount of the ink ejected from the nozzle 651 corresponding to an amount when the trapezoidal waveform Adp1 and the trapezoidal waveform Bdp2 are supplied to one end of the piezoelectric element 60 may be referred to as a small amount, and the ejection amount of the ink ejected from the nozzle 651 corresponding to an amount when the trapezoidal waveform Adp2 is supplied to one end of the piezoelectric element 60 may be referred to as a medium amount. Further, when the trapezoidal waveform Bdp1 is supplied to one end of the piezoelectric element 60, the operation of vibrating the ink near the opening of the corresponding nozzle 651 may be referred to as slight-vibration.

In the drive signals COMA and COMB including the signal waveforms as described above, the voltage values at the start timing and the end timing of each of the trapezoidal waveforms Adp1, Adp2, Bdp1 and Bdp2 are common to a voltage Vc. That is, each of the trapezoidal waveforms Adp1, Adp2, Bdp1, and Bdp2 is a signal waveform whose voltage value starts at the voltage Vc and ends at the voltage Vc. A cycle Ta consisting of the period T1 and the period T2 corresponds to a printing cycle for forming dots on the medium P.

In FIG. 8, the trapezoidal waveform Adp1 and the trapezoidal waveform Bdp2 are signal waveforms of the same shape, but the trapezoidal waveform Adp1 and the trapezoidal waveform Bdp2 may be signal waveforms of different shapes. Furthermore, the description is made assuming that a small amount of the ink is ejected from the corresponding nozzle 651 when the trapezoidal waveform Adp1 is supplied to the piezoelectric element 60 and when the trapezoidal waveform Bdp2 is supplied to the piezoelectric element 60, but the present disclosure is not limited to this. That is, the signal waveforms of the drive signals COMA and COMB are not limited to those of the example illustrated in FIG. 8, but signal waveforms of various shapes may be used according to movement speed of the carriage 71 on which the ejection head 400 is mounted, the property of the ink to be ejected from the ejection head 400, the material of the medium P on which the ink is landed, and the like. Furthermore, the shapes of the signal waveforms of the drive signals COMA and COMB supplied to the plurality of respective ejection heads 400 may be different from each other. That is, the shape of the signal waveforms of the drive signals COMAi and COMBi supplied to the ejection head 400-*i* and the shape of the signal waveforms of the drive signals COMAi+1 and COMBi+1 supplied to the ejection head 400-*i*+1 may be different from each other.

Figure 9:
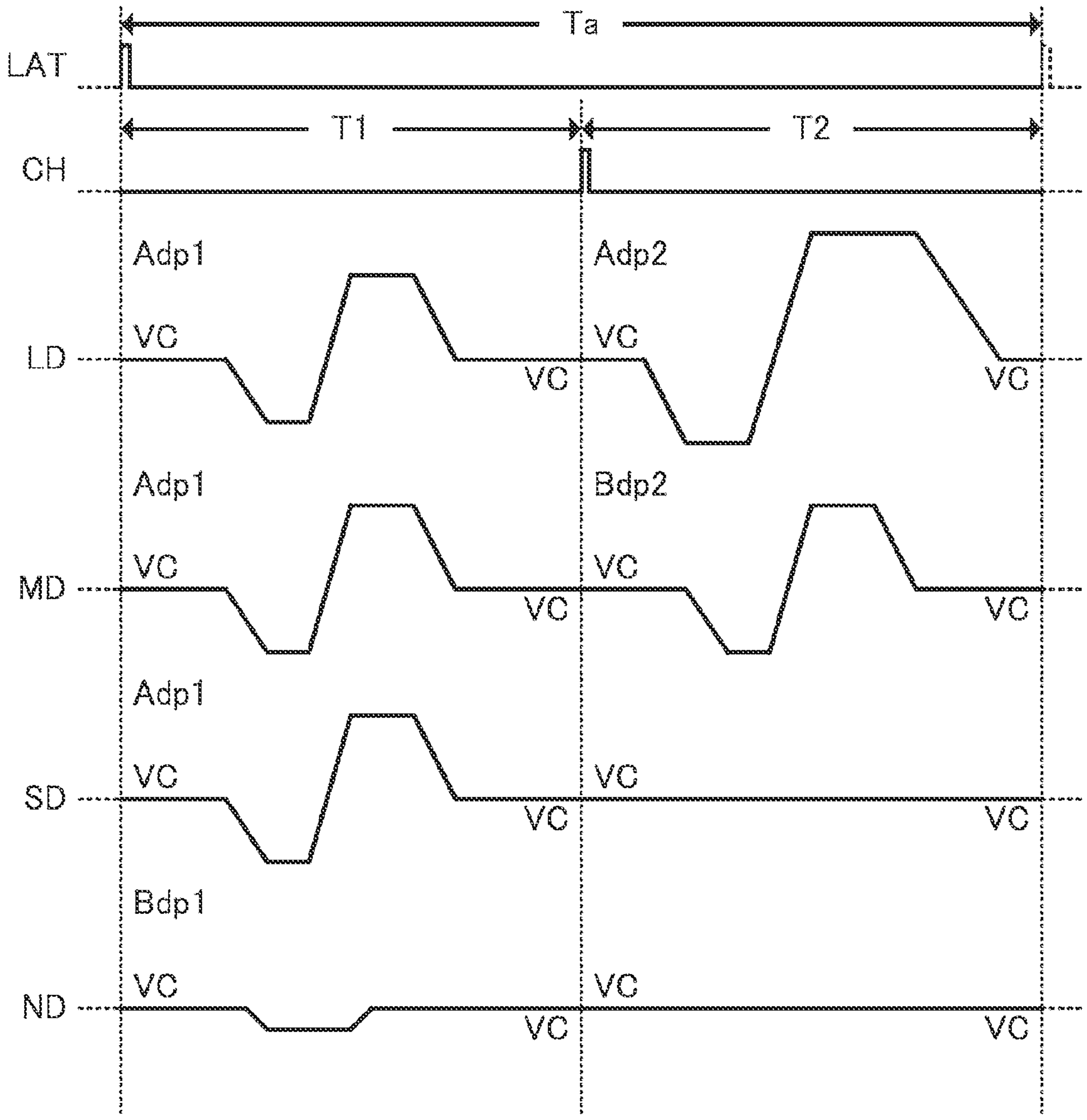
FIG. 9 is a diagram illustrating an example of a signal waveform of a drive signal VOUT.

FIG. 9 is a diagram illustrating an example of the signal waveforms of the drive signal VOUT corresponding to each size when the sizes of the dots formed on the medium P are a "large dot LD", a "medium dot MD", a "small dot SD", and "no dots recorded ND".

As illustrated in FIG. 9, the drive signal VOUT corresponding to the "large dot LD" represents a signal waveform in the cycle Ta in which the trapezoidal waveform Adp1 disposed in the period T1 and the trapezoidal waveform Adp2 disposed in the period T2 are made to be continuous. When this drive signal VOUT is supplied to one end of the piezoelectric element 60, a small amount of the ink and a medium amount of the ink are ejected from the ejection unit 600 corresponding to the piezoelectric element 60 in the cycle Ta. Therefore, the large dot LD is formed on the medium P by landing and uniting the respective amounts of ink.

The drive signal VOUT corresponding to the "medium dot MD" represents a signal waveform in the cycle Ta in which the trapezoidal waveform Adp1 disposed in the period Ti and the trapezoidal waveform Bdp2 disposed in the period T2 are made to be continuous. When this drive signal VOUT is supplied to one end of the piezoelectric element 60, a small amount of the ink is ejected twice from the ejection unit 600 corresponding to the piezoelectric element 60 in the cycle Ta. Therefore, the medium dot MD are formed on the medium P by landing and uniting the respective amounts of ink.

The drive signal VOUT corresponding to the "small dot SD" represents a signal waveform in the cycle Ta in which the trapezoidal waveform Adp1 disposed in the period T1 and a signal waveform in which the voltage value disposed in the period T2 is constant at the voltage Vc are made to be continuous. When this drive signal VOUT is supplied to one end of the piezoelectric element 60, a small amount of the ink is ejected once from the ejection unit 600 corresponding to the piezoelectric element 60 in the cycle Ta. Therefore, this ink is landed on the medium P to form the small dot SD.

The drive signal VOUT corresponding to the "no dots recorded ND" represent a signal waveform in the cycle Ta in which the trapezoidal waveform Bdp1 disposed in the period T1 and a signal waveform in which the voltage value disposed in the period T2 is constant at the voltage Vc are made to be continuous. When the drive signal VOUT is supplied to one end of the piezoelectric element 60, the ink near the opening of the nozzle 651 of the ejection unit 600 corresponding to the piezoelectric element 60 vibrates only in the cycle Ta, and no ink is ejected from the ejection unit 600. Therefore, no ink is landed on the medium P and no dots are formed on the medium P.

Here, the waveform whose voltage value is constant at the voltage Vc means a signal waveform generated when the immediately preceding voltage Vc is held by the capacitance component of the piezoelectric element 60 when none of the trapezoidal waveforms Adp1, Adp2, Bdp1, and Bdp2 is selected as the drive signal VOUT. That is, when the drive signal selection circuit 420 selects none of the trapezoidal waveforms Adp1, Adp2, Bdp1, and Bdp2 as the drive signal VOUT, the electrode 611 of the piezoelectric element 60 is supplied with a signal waveform whose voltage value is constant at the voltage Vc as the drive signal VOUT.

Figure 10:
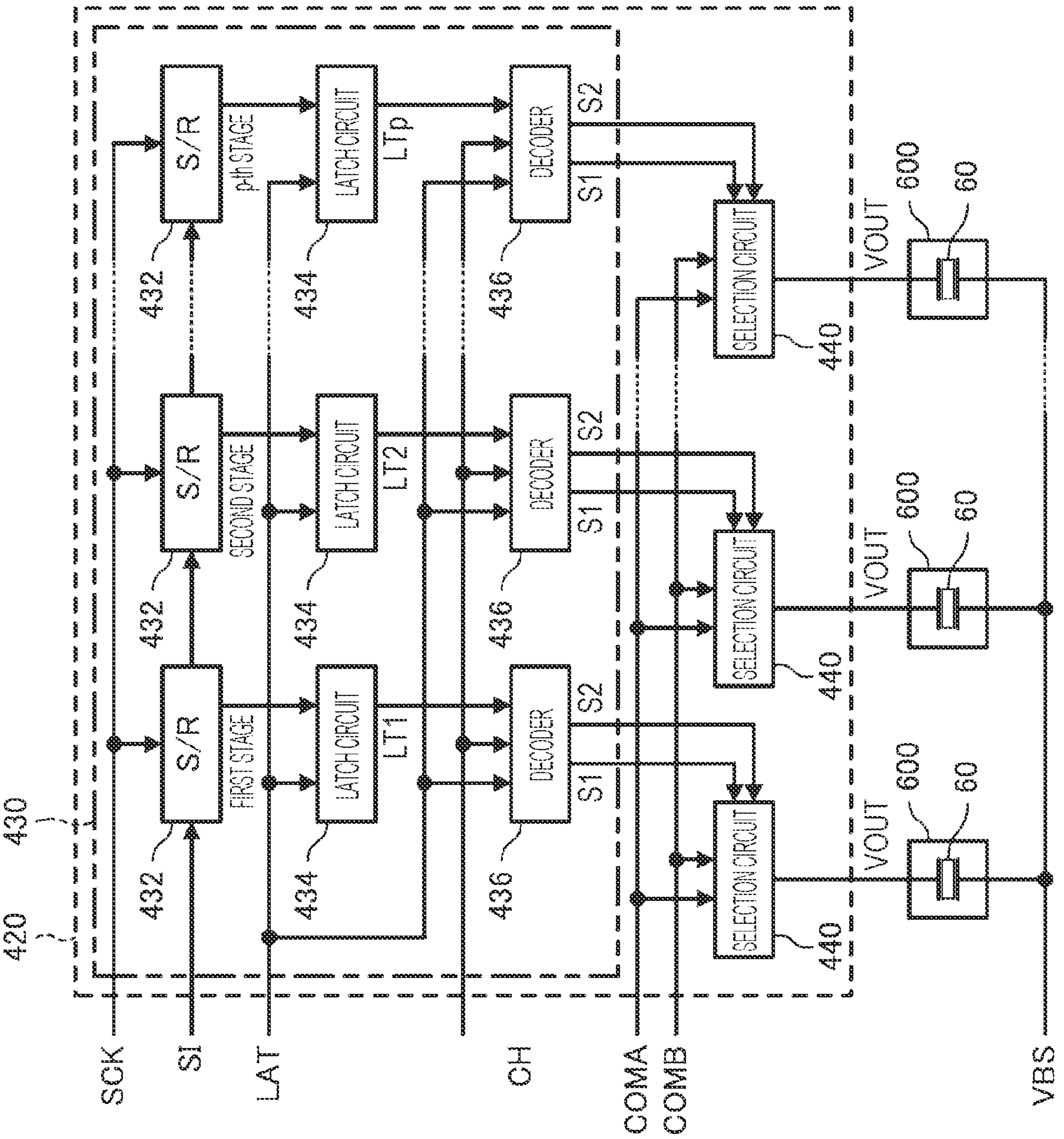
FIG. 10 is a diagram illustrating the configuration of a drive signal selection circuit.

Next, the configuration and operation of the drive signal selection circuit 420 that generates the drive signal VOUT by selecting the signal waveforms of the drive signals COMA and COMB will be described. FIG. 10 is a diagram illustrating the configuration of the drive signal selection circuit 420. As illustrated in FIG. 10, the drive signal selection circuit 420 includes a selection control circuit 430 and a plurality of selection circuits 440.

The print data signal SI, the latch signal LAT, the change signal CH, and the clock signal SCK are input to the selection control circuit 430. The selection control circuit 430 includes a set of a shift register (S/R) 432, a latch circuit 434, and a decoder 436 corresponding to each of the p ejection units 600. That is, the drive signal selection circuit 420 includes the same number of sets of the shift register 432, the latch circuit 434, and the decoder 436 as the corresponding p ejection units 600.

The print data signal SI input to the drive signal selection circuit 420 is a signal synchronized with the clock signal SCK, and is a total 2p-bit signal including 2-bit print data [SIH, SIL] for selecting any one of the "large dot LD", the "medium dot MD", the "small dot SD" and the "no dots recorded ND" for each of the p ejection units 600. The print data signal SI is held in the shift register 432 for each 2-bit print data [SIH, SIL] included in the print data signal SI corresponding to the ejection unit 600. Specifically, the p-stage shift registers 432 corresponding to the ejection units 600 are cascade-coupled to each other, and the serially input print data signal SI is sequentially transferred to the subsequent stage according to the clock signal SCK. In FIG. 10, in order to distinguish the shift registers 432, they are denoted as the first stage, the second stage, . . . , the p-th stage in order starting from the upstream shift register to which the print data signal SI is input.

The p latch circuits 434 latches the 2-bit print data [SIH, SIL] held by the respective p shift registers 432 at the rising edge of the latch signal LAT.

Figures 11, 12:
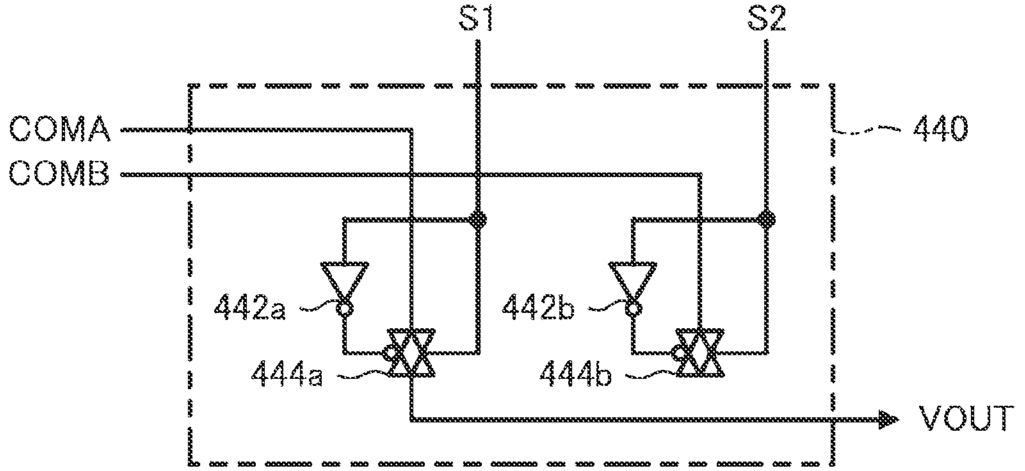
FIG. 11 is a diagram illustrating decoding contents in a decoder.
FIG. 12 is a diagram illustrating the configuration of a selection circuit.

FIG. 11 is a diagram illustrating the decoding contents in the decoder 436. The decoder 436 outputs, to the selection circuit 440, logic level selection signals S1 and S2 corresponding to the latched 2-bit print data [SIH, SIL]. For example, when the latched 2-bit print data [SIH, SIL] is [1, 0], the decoder 436 outputs a selection signal S1 that is at H and L levels in the periods T1 and T2, and a selection signal S2 that is at L and H levels in the periods T1 and T2 to the selection circuit 440.

The selection circuit 440 is provided corresponding to each ejection unit 600. That is, the number of selection circuits 440 included in the drive signal selection circuit 420 is p, which is the same as that of the corresponding ejection unit 600. FIG. 12 is a diagram illustrating the configuration of the selection circuit 440 corresponding to one ejection unit 600. As illustrated in FIG. 12, the selection circuit 440 includes inverters 442a and 442b, which are NOT circuits, and transfer gates 444a and 444b.

The selection signal S1 is input to the non-circled positive control end of the transfer gate 444a, while being input to the circled negative control end of the transfer gate 444a after logically inverted by the inverter 442a. The drive signal COMA is supplied to the input end of the transfer gate 444a. The selection signal S2 is input to the non-circled positive control end of the transfer gate 444b, while being input to the circled negative control end of the transfer gate 444b after logically inverted by the inverter 442b. The drive signal COMB is supplied to the input end of the transfer gate 444b. The output ends of the transfer gates 444a and 444b are coupled in common and the drive signal COMA and the drive signal COMB are output as the drive signal VOUT.

Specifically, when the H level selection signal S1 is input to the transfer gate 444a, the input end and the output end of the transfer gate 444a is conductive, and when the L level selection signal S1 is input to the transfer gate 444a, the input end and the output end of the transfer gate 444a is non-conductive. Similarly, when the H-level selection signal S2 is input to the transfer gate 444b, the input end and the output end of the transfer gate 444b is conductive, and when the L-level selection signal S2 is input to the transfer gate 444b, the input end and the output end of the transfer gate 444b is non-conducting. In the selection circuit 440 configured as described above, the conduction state between the input end and the output end of each of the transfer gates 444a and 444b is controlled based on the logic levels of the selection signals S1 and S2, so that the signal waveforms of the drive signals COMA and COMB supplied to the input end are selected or deselected. As a result, the selection circuit 440 generates the drive signal VOUT based on the drive signals COMA and COMB to output the generated drive signal VOUT from the drive signal selection circuit 420.

Figure 13:
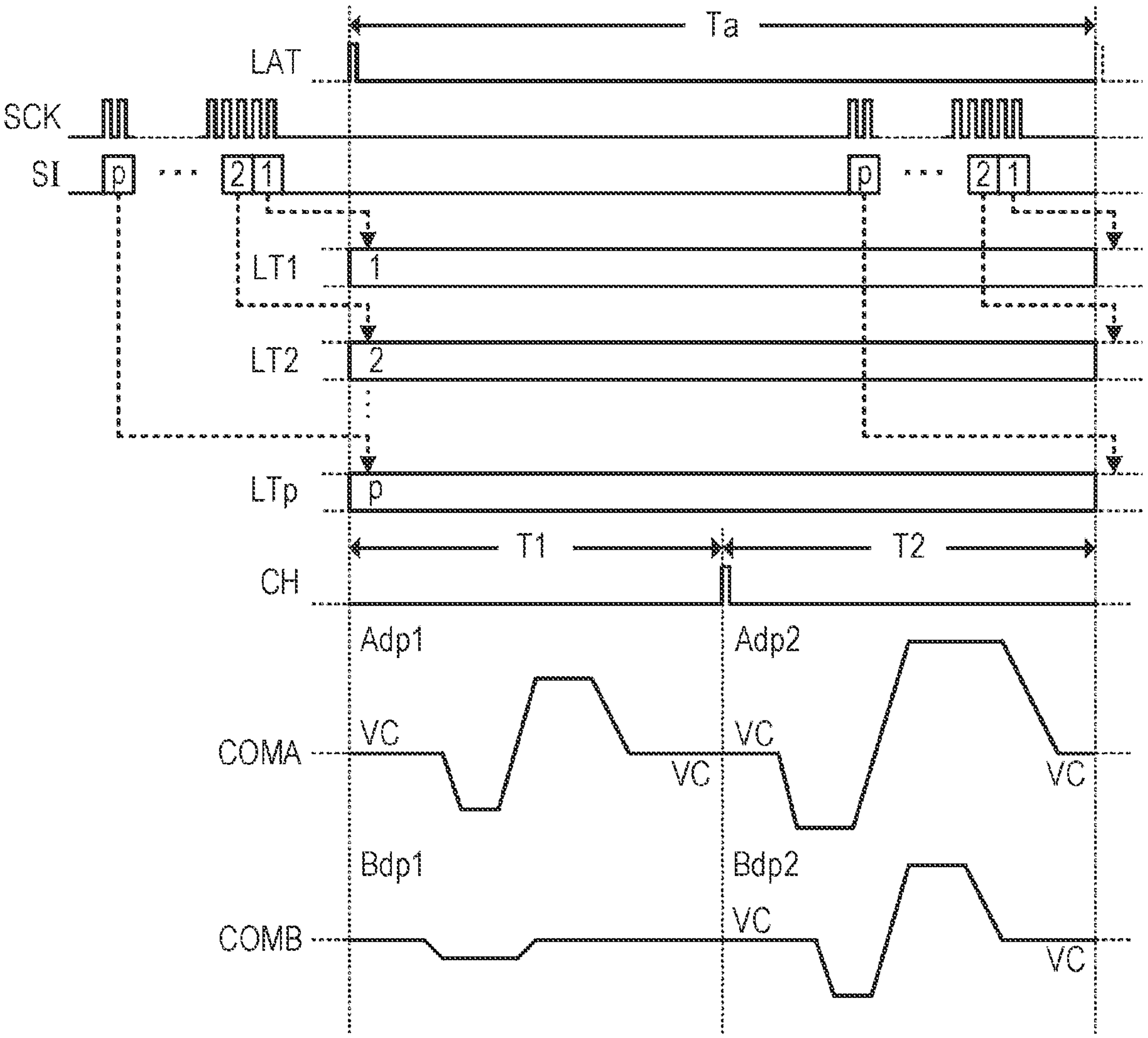
FIG. 13 is a diagram for explaining the operation of the drive signal selection circuit.

Here, the details of the operation of the drive signal selection circuit 420 will be described with reference to FIG. 13. FIG. 13 is a diagram for explaining the operation of the drive signal selection circuit 420. The print data signal SI is serially input in synchronization with the clock signal SCK and sequentially transferred in p shift registers 432 corresponding to the ejection unit 600. Then, when the input of the clock signal SCK stops, the p shift registers 432 hold 2-bit print data [SIH, SIL] corresponding to the respective ejection units 600.

When the latch signal LAT rises, the latch circuits 434 simultaneously latches the 2-bit print data [SIH, SIL] held in the corresponding shift registers 432. LT1, LT2, . . . , LTp illustrated in FIG. 13 correspond to the shift registers 432 of the first stage, the second stage, . . . , the p-th stage, and illustrates 2-bit print data [SIH, SIL] latched by the latch circuits 434.

The decoder 436 outputs the logic levels of the selection signals S1 and S2 in accordance with the contents as illustrated in FIG. 11 in each of the periods T1 and T2 according to a dot size specified by the latched 2-bit print data [SIH, SIL].

Specifically, when the input print data [SIH, SIL] is [1, 1], the decoder 436 sets the logic level of the selection signal S1 to H and H levels in the periods T1 and T2, and sets the logic level of the selection signal S2 to L and L levels in the periods T1 and T2. In this case, the selection circuit 440 selects the trapezoidal waveform Adp1 in the period T1 and selects the trapezoidal waveform Adp2 in the period T2. As a result, the drive signal selection circuit 420 outputs the drive signal VOUT corresponding to the “large dot LD” illustrated in FIG. 9.

Further, when the input print data [SIH, SIL] is [1, 0], the decoder 436 sets the logic level of the selection signal S1 to H and L levels in the periods T1 and T2, and sets the logic level of the selection signal S2 to L and H levels in the periods T1 and T2. In this case, the selection circuit 440 selects the trapezoidal waveform Adp1 in the period T1 and selects the trapezoidal waveform Bdp2 in the period T2. As a result, the drive signal selection circuit 420 outputs the drive signal VOUT corresponding to the “medium dot MD” illustrated in FIG. 9.

Further, when the input print data [SIH, SIL] is [0, 1], the decoder 436 sets the logic level of the selection signal S1 to H and L levels in the periods T1 and T2, and sets the logic level of the selection signal S2 to L and L levels in the periods T1 and T2. In this case, the selection circuit 440 selects the trapezoidal waveform Adp1 in the period T1 and selects none of the trapezoidal waveforms Adp2 or Bdp2 in the period T2. As a result, the drive signal VOUT corresponding to the “small dot SD” illustrated in FIG. 9 is generated.

Further, when the input print data [SIH, SIL] is [0, 0], the decoder 436 sets the logic level of the selection signal S1 to L and L levels in the periods T1 and T2, and sets the logic level of the selection signal S2 to H and L levels in the periods T1 and T2. In this case, the selection circuit 440 selects the trapezoidal waveform Bdp1 in the period T1 and selects none of the trapezoidal waveforms Adp2 and Bdp2 in the period T2. As a result, the drive signal VOUT corresponding to the “no dots recorded ND” illustrated in FIG. 9 is generated.

As described above, the drive signal selection circuit 420 selects the waveforms of the drive signals COMA and COMB based on the print data signal SI, the latch signal LAT, the change signal CH, and the clock signal SCK to output the selected waveforms as the drive signal VOUT. In other words, the drive signal selection circuit 420 controls supply of the drive signals COMA and COMB to the piezoelectric element 60. Accordingly, the ejection head 400 ejects the ink. That is, the ejection head 400 includes the piezoelectric element 60 driven by the drive signal VOUT based on the drive signals COMA and COMB, and ejects a liquid by driving the piezoelectric element 60.

4. Configuration and Operation of Drive Circuit

Next, the structure and operation of the drive circuits 310*a* and 310*b* that output the drive signals COMA and COMB, respectively, will be described. Here, the drive circuit 310*a* that outputs the drive signal COMA and the drive circuit 310*b* that outputs the drive signal COMB differ only in the signal that is input and the signal that is output, and have the same configuration and operation. Therefore, only the configuration and operation of the drive circuit 310*a* that outputs the drive signal COMA will be described below, and the description of the configuration and operation of the drive circuit 310*b* that outputs the drive signal COMB will be omitted.

Figure 14:
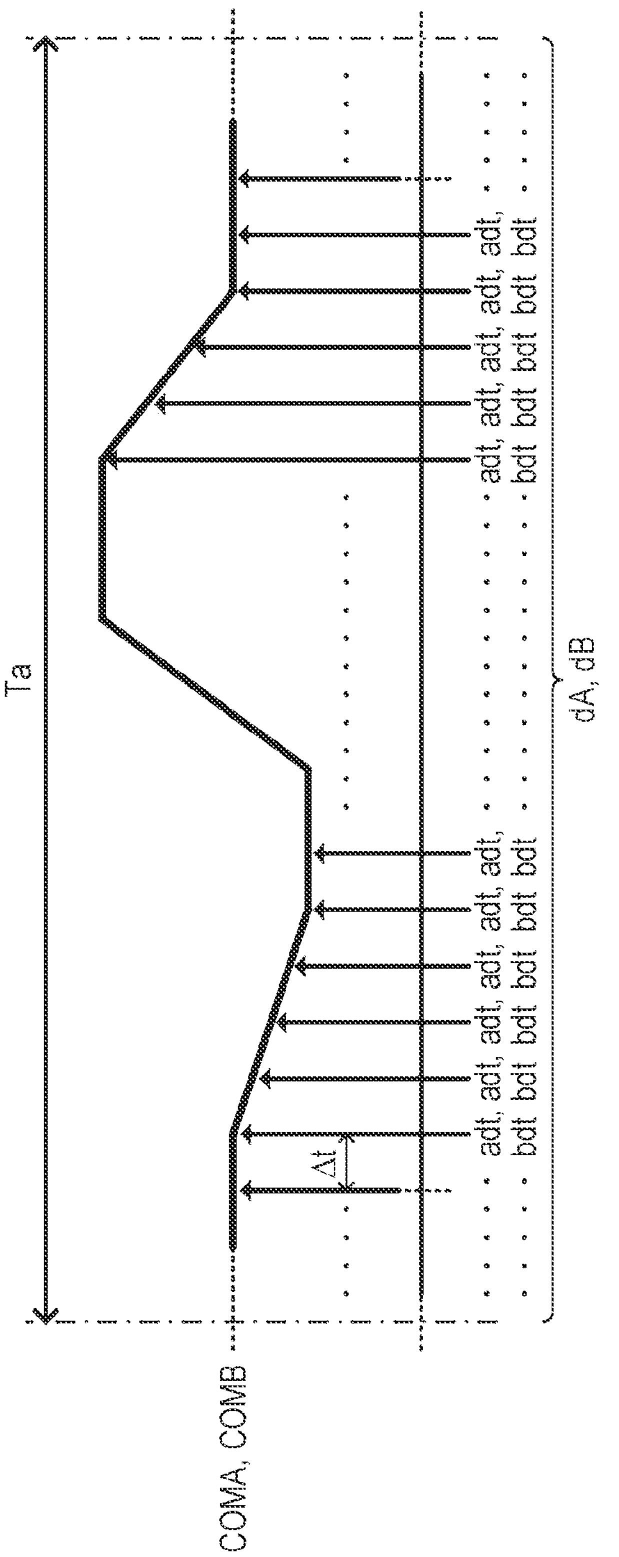
FIG. 14 is a diagram illustrating an example of the relationship between a base drive signal input to a drive circuit and a drive signal output by the drive circuit.

FIG. 14 is a diagram illustrating an example of the relationship between the base drive signal dA input to the drive circuit 310*a* and the drive signal COMA output by the drive circuit 310*a*. In FIG. 14, the signals input to and the signal output from the drive circuit 310*b* that outputs the drive signal COMB are illustrated in parentheses.

As illustrated in FIG. 14, the base drive signal dA input to the drive circuit 310*a* includes a plurality of pieces of drive data adt. The drive data adt is input to the drive circuit 310*a* at intervals Δt. Then, the drive circuit 310*a* outputs, as the drive signal COMA, a signal having a voltage value specified by the drive data adt input at intervals Δt.

Specifically, when the drive data adt that specifies a voltage v1 is input to the drive circuit 310*a* at any time t1, the drive circuit 310*a* outputs the drive signal COMA whose voltage value is the voltage v1. Then, when drive data adt specifying a voltage v2 is input to the drive circuit 310*a* at time t1 following time t0, the drive circuit 310*a* outputs the drive signal COMA whose voltage value is the voltage v2. In other words, the drive circuit 310*a* outputs the drive signal COMA whose voltage value changes from the voltage v1 to the voltage v2 from time t0 to time t1.

Specifically, the head control circuit 200 outputs the base drive signal dA including the drive data adt at intervals Δt sufficiently smaller than the cycle Ta. Therefore, the drive data adt that specifies the voltage value of the drive signal COMA at intervals Δt is input to the drive circuit 310*a*. The drive circuit 310*a* outputs a signal having a voltage value specified by the input drive data adt as the drive signal COMA. That is, the instantaneous voltage of the drive signal COMA output by the drive circuit 310*a* is specified by the drive data adt, and the signal waveform of the drive signal COMA in the cycle Ta is specified by the base drive signal dA including a plurality of pieces of drive data adt. In other words, the drive circuit 310*a* outputs the drive signal COMA based on the base drive signal dA including the plurality of pieces of drive data adt.

Similarly, the head control circuit 200 outputs the base drive signal dB including drive data bdt at intervals Δt sufficiently smaller than the cycle Ta. Therefore, drive data bdt that specifies the voltage value of the drive signal COMB is input to the drive circuit 310*b* at intervals Δt. The drive circuit 310*b* outputs a signal having a voltage value specified by the input drive data bdt as the drive signal COMB. That is, the instantaneous voltage of the drive signal COMB output by the drive circuit 310*b* is specified by the drive data bdt, and the signal waveform of the drive signal COMB in the cycle Ta is specified by the base drive signal dB including a plurality of pieces of drive data bdt. In other words, the drive circuit 310*b* outputs the drive signal COMB based on the base drive signal dB including the plurality of pieces of drive data bdt.

Here, the drive data adt and bdt may be data that specify the difference between the voltage value of each of the drive signals COMA and COMB at any time t1 and the voltage value of each of the drive signals COMA and COMB at time t2 following time t1, respectively, or may be data that specifies the voltage value of each of the drive signals COMA and COMB at any time t1, respectively.

Figure 15:
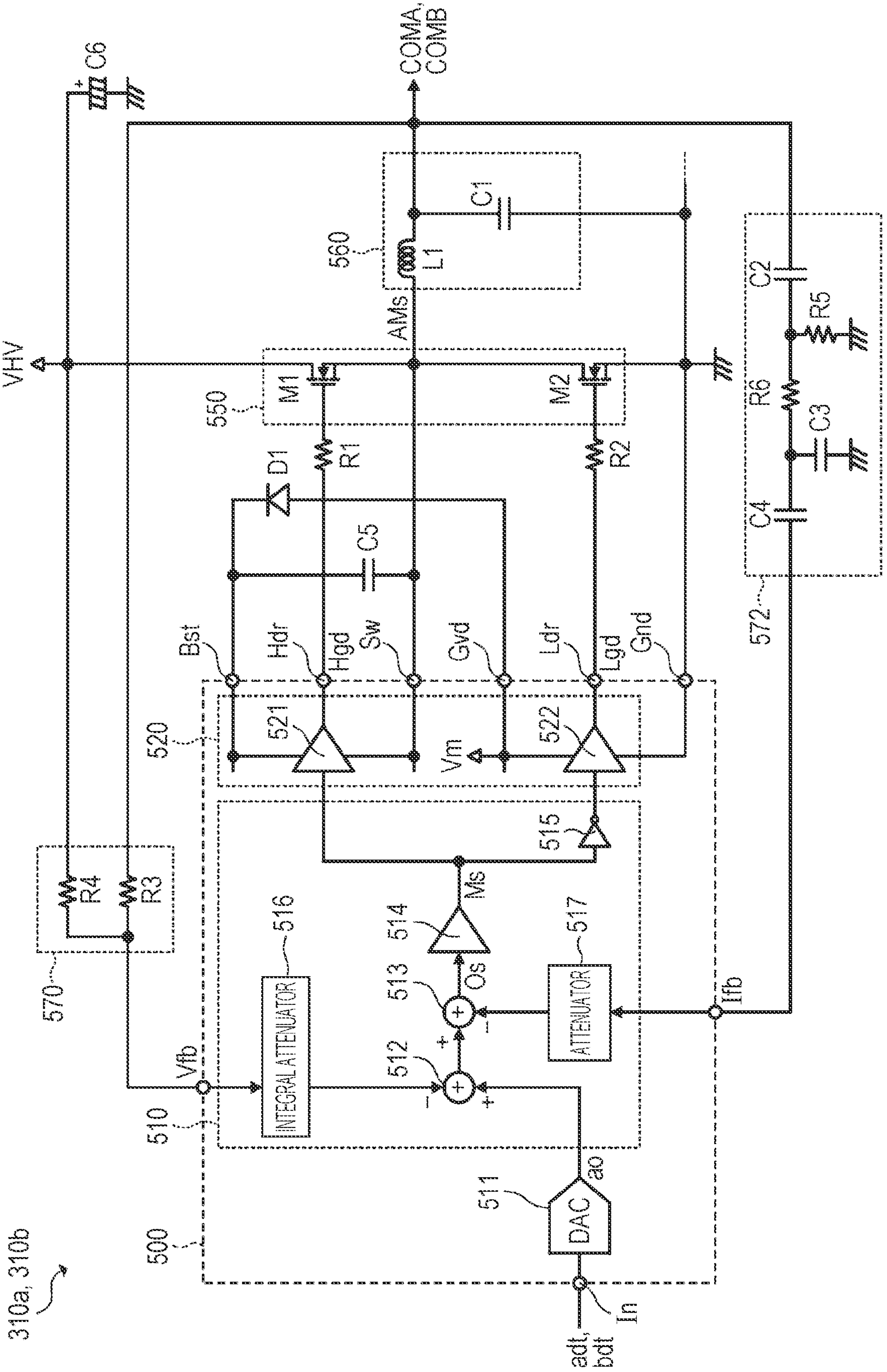
FIG. 15 is a diagram illustrating an example of the configuration of a drive circuit.

Next, a specific example of the configuration of the drive circuit 310*a* will be described with reference to FIG. 15. FIG. 15 is a diagram illustrating an example of the configuration of the drive circuit 310*a*.

As illustrated in FIG. 15, the drive circuit 310*a* includes an integrated circuit 500 including a modulation circuit 510, an amplifier circuit 550, a demodulation circuit 560, and feedback circuits 570 and 572.

The integrated circuit 500 has a plurality of terminals including a terminal In, a terminal Bst, a terminal Hdr, a terminal Sw, a terminal Gvd, a terminal Ldr, a terminal Gnd, and a terminal Vbs. The integrated circuit 500 also includes a digital to analog converter (DAC) 511, the modulation circuit 510 and a gate drive circuit 520.

The DAC 511 converts the drive data adt as the base drive signal dA that specifies the waveform of the drive signal COMA into a base drive signal ao of an analog signal. The DAC 511 then outputs the base drive signal ao to the modulation circuit 510.

The modulation circuit 510 generates a modulation signal Ms obtained by modulating the base drive signal ao to output he generated modulation signal Ms to the gate drive circuit 520. The modulation circuit 510 includes adders 512 and 513, a comparator 514, an inverter 515, an integral attenuator 516, and an attenuator 517.

The integral attenuator 516 attenuates and integrates the drive signal COMA input via a terminal Vfb, and supplies the attenuated and integrated signal to the negative input end of the adder 512. Also, the base drive signal ao is input to the positive input end of the adder 512. The adder 512 supplies a voltage signal obtained by subtracting the voltage input to the negative input end from the voltage value input to the positive input end and integrating the subtracted voltage value to the positive input end of the adder 513. Here, the maximum value of the voltage amplitude of the base drive signal ao is, for example, about 2 V, while the maximum value of the voltage of the drive signal COMA is 25 V or more, or may exceed 40 V. The integral attenuator 516 attenuates the voltage of the drive signal COMA input via the terminal Vfb in order to match the amplitude ranges of both voltages when obtaining the deviation.

The attenuator 517 supplies a voltage signal obtained by attenuating the high-frequency component of the drive signal COMA input via a terminal Ifb to the negative input end of the adder 513. The voltage signal output from the adder 512 is input to the positive input end of the adder 513. The adder 513 outputs to the comparator 514 a voltage signal Os obtained by subtracting the voltage signal input to the negative input end from the voltage signal input to the positive input end.

The comparator 514 outputs the modulation signal Ms obtained by pulse-modulating the voltage signal Os output from the adder 513. Specifically, the comparator 514 outputs the modulation signal Ms that is at H level when the voltage value of the voltage signal Os output from the adder 513 is increasing and is equal to or greater than a predetermined threshold value Vth1, and that is at L level when the voltage value of the voltage signal Os is decreasing and falls below a predetermined threshold value Vth2. Here, the threshold values Vth1 and Vth2 are set to have a relationship of the threshold value Vth1>the threshold value Vth2.

The modulation signal Ms output from the comparator 514 is supplied to a gate driver 521 included in the gate drive circuit 520. The modulation signal Ms is supplied to a gate driver 522 included in the gate drive circuit 520 after the logic level is inverted by the inverter 515. That is, the logic level of the signal supplied to the gate driver 521 and the logic level of the signal supplied to the gate driver 522 are mutually exclusive.

Here, the logic level of the signal supplied to the gate driver 521 and the logic level of the signal supplied to the gate driver 522 is only required not to be H level at the same time. A timing circuit (not illustrated) may control, for example, the timing at which the logic level of a signal supplied to the gate driver 521 is H level and the timing at which the logic level of a signal supplied to the gate driver 522 is H level. In other words, "being mutually exclusive" means that the logic levels of the signals supplied to the gate driver 521 and the gate driver 522 are not H level at the same time. For details, this means that a transistor M1 and a transistor M2 included in the amplifier circuit 550 to be described later are not turned on at the same time.

The gate drive circuit 520 includes the gate driver 521 and the gate driver 522. The gate driver 521 shifts the level of the modulation signal Ms output from the comparator 514 to output the level-shifted modulation signal Ms as an amplification control signal Hgd from the terminal Hdr. The higher side of the power supply voltage of the gate driver 521 is a voltage supplied via the terminal Bst, and the lower side is a voltage supplied via the terminal Sw. The terminal Bst is coupled to one end of a capacitor C5 and the cathode of a diode D1 for backflow prevention. Also, the terminal Sw is coupled to the other end of the capacitor C5, and the anode of the diode D1 is coupled to the terminal Gvd. As a result, a voltage Vm supplied from a power supply circuit (not illustrated) is supplied to the anode of the diode D1. Therefore, the potential difference between the terminal Bst and the terminal Sw is the potential difference between both ends of the capacitor C5 and is approximately equal to the voltage Vm. That is, the gate driver 521 outputs, from the terminal Hdr, the amplification control signal Hgd having a voltage value higher than, by the voltage Vm, that of the terminal Sw according to the input modulation signal Ms.

The gate driver 522 operates at a lower potential than the gate driver 521. The gate driver 522 shifts the level of the signal obtained by inverting, by the inverter 515, the logic level of the modulation signal Ms output from the comparator 514 to output the level-shifted signal as an amplification control signal Lgd from the terminal Ldr. The voltage Vm is supplied to the higher side of the power supply voltage of the gate driver 522, and the ground potential of, for example, 0 V is supplied to the lower side via the terminal Gnd. As a result, the gate driver 522 outputs, from the terminal Ldr, the amplification control signal Lgd having a voltage value higher than that of the terminal Gnd by the voltage Vm according to a signal obtained by inverting the logic level of the input modulation signal Ms.

The amplifier circuit 550 includes the transistor M1 and the transistor M2. An amplified voltage VHV, which is, for example, a DC voltage of 42 V, is supplied to the drain of the transistor M1. The gate of the transistor M1 is electrically coupled to one end of a resistor R1, and the other end of the resistor R1 is electrically coupled to the terminal Hdr of the integrated circuit 500. That is, the amplification control signal Hgd output from the terminal Hdr of the integrated circuit 500 is supplied to the gate of the transistor M1. The source of the transistor M1 is electrically coupled to the terminal Sw of the integrated circuit 500.

The drain of the transistor M2 is electrically coupled to the terminal Sw of the integrated circuit 500. That is, the drain of the transistor M2 and the source of the transistor M1 are electrically coupled to each other. The gate of the transistor M2 is electrically coupled to one end of a resistor R2, and the other end of the resistor R2 is electrically coupled to the terminal Ldr of the integrated circuit 500. That is, the amplification control signal Lgd output from the terminal Ldr of the integrated circuit 500 is supplied to the gate of the transistor M2. The ground potential is supplied to the source of the transistor M2.

In the amplifier circuit 550 configured as described above, when the transistor M1 is turned off and the transistor M2 is turned on, the voltage value of the node to which the terminal Sw is coupled is the ground potential. Therefore, the voltage Vm is supplied to the terminal Bst. On the other hand, when the transistor M1 is turned on and the transistor M2 is turned off, the voltage value of the node to which the terminal Sw is coupled is the amplified voltage VHV. Therefore, a signal having a voltage value of the amplified voltage VHV+the voltage Vm is supplied to the terminal Bst.

That is, when the capacitor C5 is included as a floating power supply and the potential of the terminal Sw changes to 0 V or the amplified voltage VHV according to the operation of the transistor M1 and the transistor M2, the gate driver 521 that drives the transistor M1 generates the amplification control signal Hgd having a voltage value whose L level is the voltage Vm and whose H level is the amplified voltage VHV+the voltage Vm, and supplies the generated amplification control signal Hgd to the gate of the transistor M1.

On the other hand, the gate driver 522 that drives the transistor M2 generates the amplification control signal Lgd having a voltage value whose L level is the ground potential and whose H level is the voltage Vm regardless of the operations of the transistor M1 and the transistor M2, and supplies the generated amplification control signal Lgd to the gate of transistor M2.

The amplifier circuit 550 as described above amplifies, by the transistor M1 and the transistor M2, based on the amplified voltage VHV, the modulation signal Ms obtained by modulating the base drive signals dA and aA. As a result, an amplified modulation signal AMs is generated at the coupling point where the source of the transistor M1 and the drain of the transistor M2 are commonly coupled. Then, the amplifier circuit 550 outputs a generated amplified modulation signal AMs to the demodulation circuit 560.

The demodulation circuit 560 demodulates the amplified modulation signal AMs output by the amplifier circuit 550 to generate the drive signal COMA to output the generated drive signal COMA from the drive circuit 310*a*.

The demodulation circuit 560 includes an inductor L1 and a capacitor C1. One end of the inductor L1 is coupled to one end of the capacitor C1. Further, the amplified modulation signal AMs is input to the other end of the inductor L1, and the ground potential is supplied to the other end of the capacitor C1. That is, the inductor L1 and the capacitor C1 included in the demodulation circuit 560 form a low-pass filter. The demodulation circuit 560 smooths the amplified modulation signal AMs output by the amplifier circuit 550 by using the low-pass filter to demodulate the amplified modulation signal AMs to output the demodulated signal as the drive signal COMA.

The feedback circuit 570 includes a resistor R3 and a resistor R4. The drive signal COMA is supplied to one end of the resistor R3, and the other end of the resistor R3 is coupled to the terminal Vfb and one end of the resistor R4. The amplified voltage VHV is supplied to the other end of the resistor R4. As a result, the drive signal COMA that has passed through the feedback circuit 570 is fed back to the terminal Vfb while being pulled up by the amplified voltage VHV.

The feedback circuit 572 includes capacitors C2, C3, C4 and resistors R5, R6. The drive signal COMA is supplied to one end of the capacitor C2, and the other end of the capacitor C2 is coupled to one end of the resistor R5 and one end of the resistor R6. A ground potential is supplied to the other end of the resistor R5. As a result, the capacitor C2 and the resistor R5 function as a high-pass filter. The cut-off frequency of this high-pass filter is set to approximately 9 MHz, for example. The other end of the resistor R6 is coupled to one end of the capacitor C4 and one end of the capacitor C3. A ground potential is supplied to the other end of the capacitor C3. As a result, the resistor R6 and the capacitor C3 function as a low-pass filter. The cut-off frequency of this low-pass filter is set to approximately 160 MHz, for example. That is, the feedback circuit 572 includes a high-pass filter and a low-pass filter, and functions as a bandpass filter that passes signals in a predetermined frequency range included in the drive signal COMA.

The other end of capacitor C4 is coupled to the terminal Ifb of the integrated circuit 500. As a result, a signal obtained by cutting the DC component out of the high-frequency components of the drive signal COMA that has passed through the feedback circuit 572 that functions as the bandpass filter is fed back to the terminal Ifb.

The drive signal COMA is a signal obtained by smoothing the amplified modulation signal AMs based on the base drive signal dA by the demodulation circuit 560. The drive signal COMA is integrated/subtracted via the terminal Vfb, and then fed back to the adder 512. Therefore, the drive circuit 310*a* self-oscillates at a frequency determined by the feedback delay and the feedback transfer function. However, since the feedback path via the terminal Vfb has a large delay amount, so that the frequency of the self-oscillation may not be made high enough to ensure the accuracy of the drive signal COMA simply by the feedback via the terminal Vfb. Therefore, the delay in the entire circuit is reduced by providing a path through which the high-frequency component of the drive signal COMA is fed back via the terminal Ifb separately from the path via the terminal Vfb. As a result, the frequency of the voltage signal Os can be made high enough to ensure the accuracy of the drive signal COMA, compared with a frequency when there is no path via the terminal Ifb.

5. Configuration and Operation of Ejection Control Circuit

As described above, the liquid ejection apparatus 1 of the present embodiment includes the head unit 20 that includes the ejection head 400 that includes the piezoelectric element 60 driven by the drive signal VOUT based on the drive signals COMA and COMB, and that ejects the ink by driving the piezoelectric element 60, an ejection control circuit 23 that includes the drive circuit 310*a* that outputs the drive signal COMA based on the base drive signal dA including a plurality of pieces of drive data adt, and the drive circuit 310*b* that outputs the drive signal COMB based on the base drive signal dB including a plurality of pieces of drive data bdt and to which the transmission signal Tx including base drive signals dA and dB is input, the head control unit 10 that includes the main control circuit 100 that outputs the transmission signal Tx including the base drive signals dA and dB to the ejection control circuit 23, and the cable 82 that communicably couples the ejection control circuit 23 and the main control circuit 100 and through which the transmission signal Tx propagates. In the liquid ejection apparatus 1 as described above, the configuration and operation of the ejection control circuit 23 to which the transmission signal Tx output by the main control circuit 100 of the head control unit 10 is input, and that controls the ejection of the ink from the ejection head 400 based on the transmission signal Tx will be described.

Figure 16:
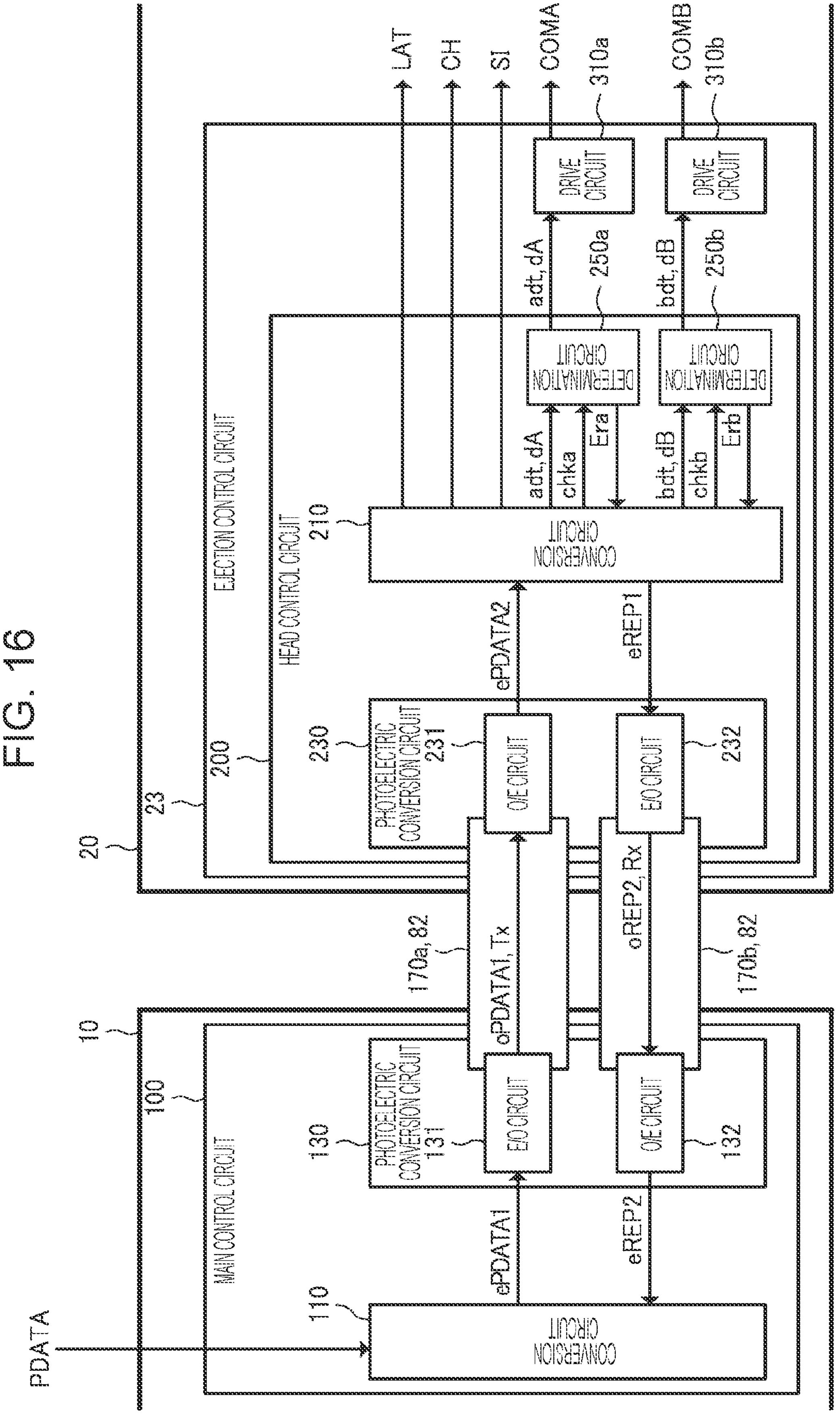
FIG. 16 is a diagram for explaining the configuration and the operation of an ejection control circuit.

FIG. 16 is a diagram for explaining the configuration and operation of the ejection control circuit 23. In addition to the ejection control circuit 23, FIG. 16 illustrates the main control circuit 100 that outputs the transmission signal Tx to the ejection control circuit 23, and the cable 82 that communicably couples the ejection control circuit 23 and the main control circuit 100.

As illustrated in FIG. 16, the main control circuit 100 included in the head control unit 10 includes a conversion circuit 110 and a photoelectric conversion circuit 130, and the ejection control circuit 23 included in the head unit 20 includes the head control circuit 200 and the drive circuits 310*a* and 310*b*. The head control circuit 200 includes a conversion circuit 210, a photoelectric conversion circuit 230, and determination circuits 250*a* and 250*b*. The main control circuit 100 and the head control circuit 200 of the ejection control circuit 23 are communicably coupled by two optical cables 170*a* and 170*b* as the cable 82. That is, the cable 82 that communicably couples the main control circuit 100 and the head control circuit 200 of the ejection control circuit 23 includes the optical cables 170*a* and 170*b*, and the transmission signal Tx and the reception signal Rx propagating through the optical cables 170*a* and 170*b* between the main control circuit 100 and the head control circuit 200 of the ejection control circuit 23 are optical signals. An example of the optical cables 170*a* and 170*b* is an optical fiber cable.

The conversion circuit 110 generates an image signal ePDATA1, which is an electric signal, by performing the above-described color conversion process, halftone process, and the like on the image signal PDATA supplied from a host computer (not illustrated) or the like. That is, the conversion circuit 110 converts the image signal PDATA into an image signal ePDATA. The conversion circuit 110 then outputs the image signal ePDATA1 to the photoelectric conversion circuit 130. The conversion circuit 110 receives a response signal eREP2. The response signal eREP2 includes a signal indicating that the image signal ePDATA1 output by the conversion circuit 110 is successfully propagated to the corresponding head unit 20.

The photoelectric conversion circuit 130 includes an E/O circuit 131 and an O/E circuit 132. The E/O circuit 131 includes, for example, a light emitting element and the like, and converts an electric signal into an optical signal. Specifically, the E/O circuit 131 receives the image signal ePDATA1, which is an electric signal, from the conversion circuit 110. The E/O circuit 131 converts the input image signal ePDATA1 into an image signal oPDATA, which is an optical signal, to output the image signal oPDATA. The image signal oPDATA output by the E/O circuit 131 is propagated through the optical cable 170*a* and input to the head unit 20.

The O/E circuit 132 includes, for example, a light receiving element or the like, and converts an input optical signal into an electric signal. Specifically, the O/E circuit 132 receives a response signal oREP, which is an optical signal output by the head unit 20 and propagated through the optical cable 170*b*. The O/E circuit 132 then converts the input response signal oREP into the response signal eREP2, which is an electric signal, to output the response signal eREP2 to the conversion circuit 110. The conversion circuit 110 may output a new image signal ePDATA1 according to the information included in the input response signal eREP2, and may notify an external device such as a host computer (not illustrated) of the information included in the response signal eREP2.

Here, the image signal oPDATA, which is an optical signal output by the E/O circuit 131, corresponds to the transmission signal Tx described above, and the response signal oREP, which is an optical signal input to the O/E circuit 132, corresponds to the reception signal Rx described above.

The photoelectric conversion circuit 230 included in the head control circuit 200 includes an O/E circuit 231 and an E/O circuit 232. The O/E circuit 231 includes a light receiving element and the like, and converts an optical signal into an electric signal. Specifically, the O/E circuit 231 receives the image signal oPDATA propagating through the optical cable 170*a*. The O/E circuit 231 converts the image signal oPDATA, which is an input optical signal, into an image signal ePDATA2, which is an electric signal, to output the image signal ePDATA2 to the conversion circuit 210.

The E/O circuit 232 includes, for example, a light emitting element or the like, and converts an electric signal into an optical signal. Specifically, the E/O circuit 232 receives a response signal eREP1, which is an electric signal, from the conversion circuit 210. The E/O circuit 232 converts the input response signal eREP1 into the response signal oREP, which is an optical signal, to output the response signal oREP. The response signal oREP output by the E/O circuit 232 propagates through the optical cable 170*b* and is input to the O/E circuit 132. That is, the ejection control circuit 23 of the head unit 20 includes the photoelectric conversion circuit 230 that converts an optical signal into an electric signal.

The conversion circuit 210 converts the image signal ePDATA2 into parallel signals including the print data signal SI, the latch signal LAT, the change signal CH, the clock signal SCK, the base drive signals dA and dB, and determination data chka and chkb. That is, the conversion circuit 210 included in the ejection control circuit 23 includes a deserializer.

Specifically, the conversion circuit 210 deserializes the input image signal ePDATA2 to generate the print data signal SI, the latch signal LAT, the change signal CH, the clock signal SCK, the base drive signals dA and dB, and the determination data chka and chkb. That is, the image signal ePDATA2 input to the conversion circuit 210 serially includes the print data signal SI, the latch signal LAT, the change signal CH, the clock signal SCK, the base drive signals dA and dB, and the determination data chka and chkb. Therefore, the image signal oPDATA, which is an optical signal, corresponding to the electric image signal ePDATA2, which is an electric signal, and the image signal ePDATA1, which is an electric signal, corresponding to the image signal oPDATA, which is an optical signal, are signals serially including the print data signal SI, the latch signal LAT, the change signal CH, the clock signal SCK, the base drive signals dA and dB, and the determination data chka and chkb.

That is, the conversion circuit 110 included in the main control circuit 100 performs a predetermined signal process on various signals including the image signal PDATA to generate the print data signal SI, the latch signal LAT, the change signal CH, the clock signal SCK, the base drive signals dA and dB, and the determination data chka and chkb, and output signals serially including the print data signal SI, the latch signal LAT, the change signal CH, the clock signal SCK, the base drive signals dA and dB, and the determination data chka and chkb as the image signal ePDATA1. In other words, the conversion circuit 110 includes a serializer.

Here, in the present embodiment, the description is made assuming that all of the print data signal SI, the latch signal LAT, the change signal CH, the clock signal SCK, the base drive signals dA and dB, and the determination data chka and chkb are serially included in the image signals ePDATA1, oPDATA, and ePDATA2, but at least one of the print data signal SI, the latch signal LAT, the change signal CH, and the clock signal SCK may not be included in the image signals ePDATA1, oPDATA, and ePDATA2. In this case, any one of the print data signal SI, the latch signal LAT, the change signal CH, and the clock signal SCK that are not included in the image signals ePDATA1, oPDATA, and ePDATA2 may be input to the head unit 20 as electric signals.

The conversion circuit 210 outputs the print data signal SI, the latch signal LAT, the change signal CH, and the clock signal SCK among the signals generated by the deserialization to the corresponding ejection heads 400 via the corresponding drive circuit boards 30.

In addition, the conversion circuit 210 outputs the drive data adt included in the base drive signal dA and the determination data chka corresponding to the drive data adt among the signals generated by deserialization to the determination circuit 250*a* at intervals of Δt. The determination circuit 250*a* determines whether the input drive data adt is normal based on the input determination data chka. Specifically, the determination data chka is checksum data corresponding to the drive data adt, and the determination circuit 250*a* calculates the checksum of the input drive data adt, and compares the calculated checksum with the determination data chka. As a result, the determination circuit 250*a* determines whether the input drive data adt is normal.

The determination circuit 250*a* outputs the input drive data adt to the drive circuit 310*a* when the input drive data adt is normal, and outputs an anomaly signal Era indicating that the input drive data adt is not normal to the conversion circuit 210 when the input drive data adt is not normal. As a result, the drive circuit 310*a* generates the drive signal COMA based on the normal drive data adt to output the generated drive signal COMA to the ejection head 400.

Similarly, the conversion circuit 210 outputs the drive data bdt included in the base drive signal dB and the determination data chkb corresponding to the drive data bdt among the signals generated by deserialization to the determination circuit 250*b* at intervals Δt. The determination circuit 250*b* determines whether the input drive data bdt is normal based on the input determination data chkb. Specifically, the determination data chkb is checksum data corresponding to the drive data bdt, and the determination circuit 250*b* calculates the checksum of the input drive data bdt, and compares the calculated checksum with the determination data chkb. As a result, the determination circuit 250*b* determines whether the input drive data bdt is normal.

The determination circuit 250*b* outputs the input drive data bdt to the drive circuit 310*b* when the input drive data bdt is normal, and outputs an anomaly signal Erb indicating that the input drive data bdt is not normal to the conversion circuit 210 when the input drive data bdt is not normal. As a result, the drive circuit 310*a* generates the drive signal COMB based on the normal drive data bdt to output the generated drive signal COMB to the ejection head 400.

That is, the ejection control circuit 23 includes the determination circuit 250*a* that determines, using the determination data chka, whether the plurality of pieces of drive data adt is normal, and the determination circuit 250*b* that determines, using the determination data chkb, whether the plurality of pieces of drive data bdt is normal.

The conversion circuit 210 generates the response signal eREP1 based on the anomaly signal Era input from the determination circuit 250*a* and the anomaly signal Erb input from the determination circuit 250*b* to output the generated response signal eREP1 to the E/O circuit 232 included in the photoelectric conversion circuit 230. The E/O circuit 232 converts the input response signal eREP1 into the response signal oREP, which is an optical signal, to output the response signal oREP. Then, the response signal oREP output by the E/O circuit 232 propagates through the optical cable 170*b* and is input to the O/E circuit 132.

Here, the determination data chka and chkb may include an authentication code replaced with or in addition to the checksum data described above. Further, the determination circuits 250*a* and 250*b* may have a function of correcting errors in the drive data adt and bdt based on the input determination data chka and chkb.

Next, a specific example of the operation of the determination circuits 250*a* and 250*b* will be described. Note that the determination circuit 250*a* and the determination circuit 250*b* differ only in input signals and output signals, and perform similar operations. Therefore, the operation of the determination circuit 250*a* will be described below, and the description of the operation of the determination circuit 250*b* will be omitted.

Figure 17:
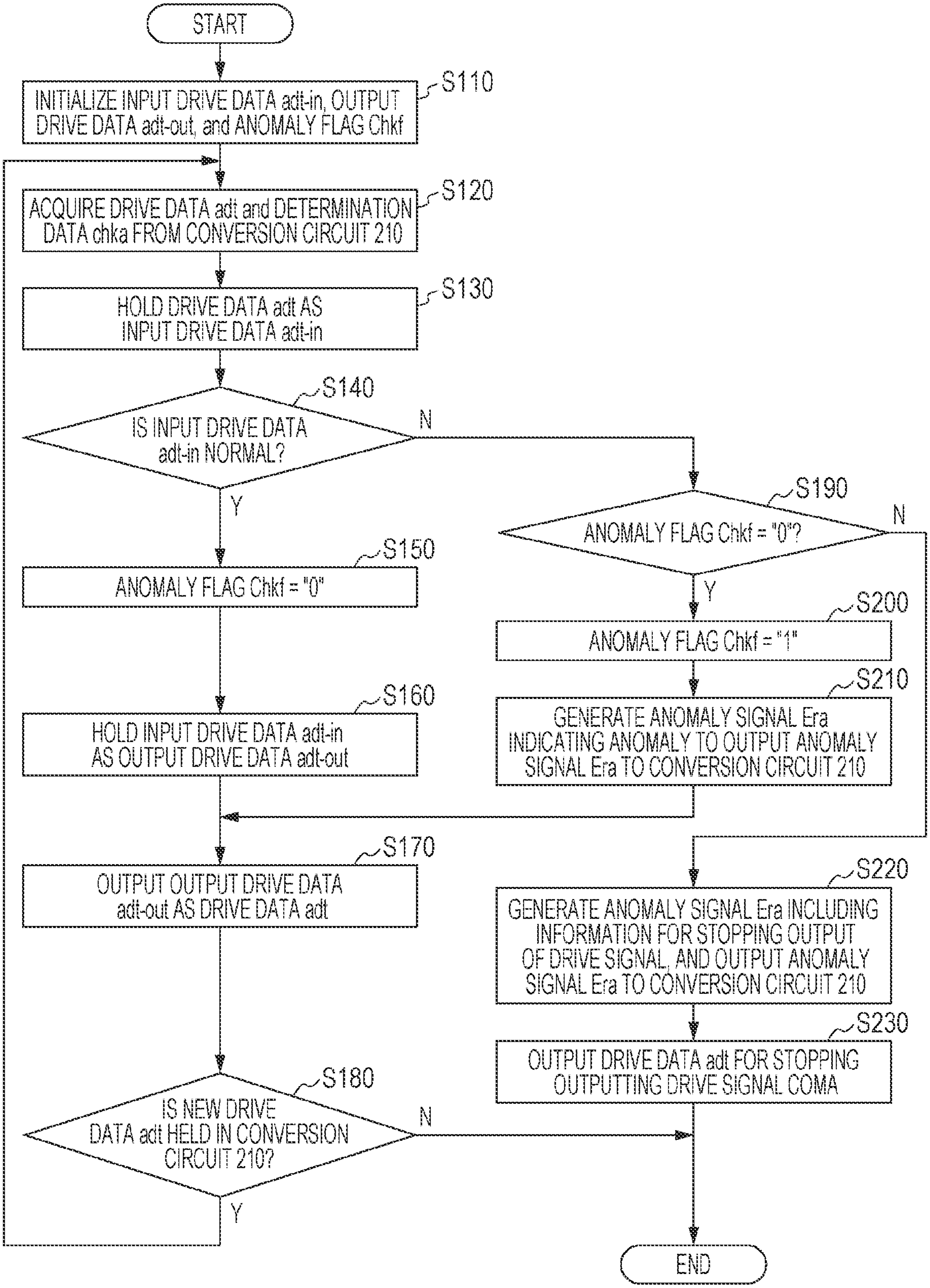
FIG. 17 is a diagram for explaining the operation of a conversion circuit.

FIG. 17 is a diagram for explaining the operation of determination circuit 250*a*. The determination circuit 250*a* has a storage area (not illustrated) such as a register. Input drive data adt-in, output drive data adt-out, and an anomaly flag Chkf are stored in a storage area of the determination circuit 250*a*. Then, at the predetermined timing before the image signal ePDATA2 is input to the conversion circuit 210, the determination circuit 250*a* initializes the input drive data adt-in, the output drive data adt-out, and the anomaly flag Chkf stored in the storage area (step S110). Here, as the input drive data adt-in and the output drive data adt-out are initialized, the determination circuit 250*a* holds the data for outputting the voltage value of the voltage Vc as the input drive data adt-in and the output drive data adt-out, for example, as the drive signal COMA, and holds the anomaly flag Chkf as “0” as the anomaly flag Chkf is initialized.

After that, the determination circuit 250*a* acquires the drive data adt output by the conversion circuit 210 and the determination data chka corresponding to the acquired drive data adt. That is, the determination circuit 250*a* acquires the drive data adt and the determination data chka from the conversion circuit 210 (step S120). Then, the determination circuit 250*a* holds the acquired drive data adt as the input drive data adt-in (step S130). Here, the determination circuit 250*a* acquiring the data from the conversion circuit 210 includes the conversion circuit 210 outputting desired data to the determination circuit 250*a* at the predetermined timing.

Thereafter, the determination circuit 250*a* determines whether the input drive data adt-in is normal (step S140). That is, the determination circuit 250*a* determines whether the drive data adt held as the input drive data adt-in is normal. Specifically, as described above, the determination data chka includes the checksum data of the corresponding drive data adt, and the determination circuit 250*a* calculates the checksum of the drive data adt held as the input drive data adt-in, compares the calculated checksum with the determination data chka, and determine whether the input drive data adt-in is normal.

When the determination circuit 250*a* determines that the input drive data adt-in is normal (Y in step S140), that is, the determination circuit 250*a* determines that the drive data adt held as the input drive data adt-in is normal, the determination circuit 250*a* sets the anomaly flag Chkf to "0" (step S150), and holds the input drive data adt-in as the output drive data adt-out (step S160). That is, when the determination circuit 250*a* determines that the drive data adt is normal, the determination circuit 250*a* holds the held drive data adt as the input drive data adt-in as the output drive data adt-out.

Then, the determination circuit 250*a* outputs the output drive data adt-out as the drive data adt (step S170). That is, the input drive data adt is output to the drive circuit 310*a*. As a result, the drive circuit 310*a* outputs the drive signal COMA based on the drive data adt input to the determination circuit 250*a*. In other words, when the determination circuit 250*a* determines that the input drive data adt among the plurality of pieces of drive data adt is normal, the drive circuit 310*a* outputs the drive signal COMA based on the input drive data adt.

After that, the determination circuit 250*a* determines whether the drive data adt subsequent to the drive data adt output to the drive circuit 310*a* is held in the conversion circuit 210 (step S180). When the drive data adt subsequent to the input drive data adt is held in the conversion circuit 210 (Y in step S180), the determination circuit 250*a* acquires the new drive data adt from the conversion circuit 210 and the determination data chka corresponding to the new drive data adt (step S120), and the above-described process is continued. On the other hand, when the drive data adt subsequent to the input drive data adt is not held in the conversion circuit 210 (N in step S180), the determination circuit 250*a* stops the operation.

When the determination circuit 250*a* determines that the input drive data adt-in is not normal (N in step S140), that is, the determination circuit 250*a* determines that the drive data adt held as the input drive data adt-in is not normal, the determination circuit 250*a* determines whether the held anomaly flag Chkf is "0" (step S190).

When the anomaly flag Chkf held by the determination circuit 250*a* is "0" (Y in step S190), the determination circuit 250*a* sets the held anomaly flag Chkf to "1" (step S200), and generates the anomaly signal Era indicating that the input drive data adt is abnormal to output the generated anomaly signal Era to the conversion circuit 210 (step S210). Then, the determination circuit 250*a* outputs the held output drive data adt-out as the drive data adt (step S170).

At this time, in the output drive data adt-out held by the determination circuit 250*a*, the drive data adt determined to be normal most recently among the drive data adt input to the determination circuit 250*a* is held. That is, when the determination circuit 250*a* determines that the input drive data adt-in is not normal, the determination circuit 250*a* outputs the drive data adt determined to be normal most recently to the drive circuit 310*a*. As a result, the drive circuit 310*a* outputs the drive signal COMA based on the drive data adt determined to be normal most recently. In other words, when the determination circuit 250*a* determines that the input drive data adt among the plurality of pieces of drive data adt is not normal, the drive circuit 310*a* outputs the drive signal COMA based on the drive data adt determined to be normal most recently.

Further, when the held anomaly flag Chkf is "1" (N in step S190), the determination circuit 250*a* determines that the drive data adt input to the determination circuit 250*a* is abnormal consecutively. Then, when the abnormal drive data adt is consecutively input, the determination circuit 250*a* generates the anomaly signal Era including information for stopping outputting the drive signal COMA in the drive circuit 310*a* to output the generated anomaly signal Era to the conversion circuit 210 (step S220), and the drive circuit 310*a* outputs the drive data adt for stopping outputting the drive signal COMA to the drive circuit 310*a* (step S230), and then stops the operation.

That is, when the determination circuit 250*a* determines that the drive data adt subsequent to the drive data adt determined to be not normal among the plurality of pieces of drive data adt is not normal, the drive circuit 310*a* stops outputting the drive signal COMA, and the determination circuit 250*a* outputs the anomaly signal Era including anomaly information.

Here, the drive data adt for stopping the operation of the drive circuit 310*a* may be, for example, data for the drive circuit 310*a* to output a signal having a constant voltage value at the voltage Vc as the drive signal COMA, and further, may be data for the drive circuit 310*a* to sweep the voltage value of the signal output as the drive signal COMA toward the voltage Vc, and after reaching the voltage Vc, output a signal having a constant voltage value at the voltage Vc.

As described above, the determination circuit 250*a* determines, based on the determination data chka, whether the drive data adt input from the conversion circuit 210 is normal. When the input drive data adt is normal, the determination circuit 250*a* outputs the input drive data adt to the drive circuit 310*a*, and when the input drive data adt is not normal, the determination circuit 250*a* outputs the determined drive data adt determined to be normal most recently to the drive circuit 310*a*. Furthermore, when the determination circuit 250*a* determines that the input drive data adt is not normal consecutively, the determination circuit 250*a* stops the operation of the drive circuit 310*a*. Here, in an example of the operation of the determination circuit 250*a* illustrated in FIG. 17, the description is made assuming that the operation of the drive circuit 310*a* is stopped when it is determined that the input drive data adt is not normal consecutively twice, but the present disclosure is not limited to this. The operation of the drive circuit 310*a* may be stopped when it is determined that the input drive data adt is not normal consecutively a predetermined number of times or more.

Here, the piezoelectric element 60 is an example of a drive element, and the drive signal VOUT that drives the piezoelectric element 60 is an example of a drive signal. Considering that the drive signal VOUT is generated by selecting the signal waveforms of the drive signals COMA and COMB, the drive signals COMA and COMB are also examples of drive signals. At least one of the print data signal SI, the latch signal LAT, the change signal CH, and the clock signal SCK is an example of the print signal, the determination data chka and chkb corresponding to the base drive signals dA and dB are an example of the determination signals, a plurality of pieces of drive data adt and bdt included in the base drive signals dA, dB that are the bases of the drive signals COMA and COMB are an example of a plurality of pieces of drive data, and a transmission signal Tx serially including the base drive signals dA and dB that are the bases of the drive signals COMA and COMB, the determination data chka and chkb corresponding to the base drive signals dA and dB, and the print data signal SI, the latch signal LAT, the change signal CH, and the clock signal SCK and the image signal oPDATA, which is an optical signal corresponding to the transmission signal Tx, are an example of the ejection control signals. Furthermore, among the plurality of pieces of drive data adt and bdt included in the base drive signals dA and dB, the drive data adt and bdt determined to be normal by the determination circuits 250*a* and 250*b* are an example of the first drive data, the drive data adt and bdt determined to be not normal by the determination circuits 250*a* and 250*b*, subsequent to the drive data adt and bdt corresponding to the first drive data are an example of the second drive data, and the drive data adt and bdt determined to be not normal by the determination circuits 250*a* and 250*b*, subsequent to the drive data adt and bdt corresponding to the second drive data are an example of the third drive data.

6. Functions and Effects

As described above, in the liquid ejection apparatus 1 according to the present embodiment, the transmission signal Tx output by the head control unit 10 and input to the head unit 20 and the image signal oPDATA, which is an optical signal corresponding to the transmission signal Tx, include the base drive signals dA and dB that are the bases of the drive signals COMA and COMB for driving the piezoelectric element 60 included in the ejection head 400 and the determination data chka and chkb corresponding to the base drive signals dA and dB. As a result, in the head unit 20, the ejection control circuit 23 provided in the head unit 20 and communicably coupled to the main control circuit 100 via the cable 82 can determine whether the signal input from the main control circuit 100 is normal, so that the possibility that an unintended signal is supplied to each component of the head unit 20 is reduced. That is, the possibility of malfunction of the head unit 20 due to the supply of an unintended signal is reduced, and as a result, the ejection characteristics of the ink from the head unit 20 are further improved.

Further, in the liquid ejection apparatus 1 according to the present embodiment, the controller 2 including the head control unit 10 including the main control circuit 100 is fixed inside the liquid ejection apparatus 1, and the ejection head 400 and the ejection control circuit 23 that are included in the head unit 20 is mounted on the carriage 71. That is, the ejection control circuit 23 is located closer to the ejection head 400 than the main control circuit 100. As a result, the propagation paths of the drive signals COMA and COMB output by the ejection control circuit 23 can be shortened, and as a result, the signal waveforms of the drive signals COMA and COMB are less likely to be distorted. Therefore, the accuracy of the drive signal VOUT supplied to the piezoelectric element 60 is improved, and the driving accuracy of the piezoelectric element 60 is improved. Therefore, the ejection accuracy of the ink ejected by driving the piezoelectric element 60 is improved.

However, since the ejection control circuit 23 is located closer to the ejection head 400 than the main control circuit 100, the length of the cable 82 that communicably couples the ejection control circuit 23 and the main control circuit 100 and through which the transmission signal Tx propagates increases. That is, the length of the cable 82 is longer than the length of the propagation path through which the drive signals COMA and COMB propagate from the ejection control circuit 23 to the ejection head 400. For this reason, for the problem that noise may be superimposed on the transmission signal Tx in the cable 82, and the ejection characteristics of the ink from the head unit 20 may deteriorate, the liquid ejection apparatus 1 according to the present embodiment can reduce the possibility of malfunction of the head unit 20 due to an unintended signal being supplied to the head unit 20, so that even when the length of the cable 82 is longer than the length of the propagation path through which the drive signals COMA and COMB propagate from the ejection control circuit 23 to the ejection head 400, it is possible to reduce the possibility that the ejection characteristics of the ink from the head unit 20 may deteriorate.

In addition, by using the image signal oPDATA, which is an optical signal, as the transmission signal Tx propagating through the cable 82, it is possible to increase the data transfer rate between the ejection control circuit 23 and the main control circuit 100, thereby increasing the ejection speed of the ink in the liquid ejection apparatus 1 and the head unit 20. That is, the speed of forming an image on the medium P can be increased. However, when the image signal oPDATA, which is an optical signal, is used as the transmission signal Tx propagating through the cable 82, the ejection control circuit 23 and the main control circuit 100 are required to convert an electric signal into an optical signal and restore an optical signal into an electric signal.

That is, the number of signal conversions executed by the ejection control circuit 23 and the main control circuit 100 increases. Therefore, when the image signal oPDATA, which is an optical signal, is used as the transmission signal Tx propagating through the cable 82, the possibility of errors occurring in the transmission signal Tx and the image signal oPDATA increases due to the signal conversion. In the liquid ejection apparatus 1 according to the present embodiment, since it is possible to reduce the possibility that the head unit 20 may malfunction due to the supply of an unintended signal, even when the image signal oPDATA, which is an optical signal, is used as the transmission signal Tx propagating through the cable 82, it is possible to reduce the possibility that the ejection characteristics of the ink from the head unit 20 may deteriorate.

Further, in the liquid ejection apparatus 1 and the head unit 20 according to the present embodiment, the ejection control circuit 23 includes the determination circuits 250*a* and 250*b* that determines, based on a plurality of pieces of drive data adt and bdt included in the input base drive signals dA and dB and the determination data chka and chkb, whether the input base drive signals dA and dB are normal. When the input drive data adt and bdt are normal, the determination circuits 250*a* and 250*b* output the input drive data adt and bdt to the drive circuits 310*a* and 310*b*, and when the input drive data adt and bdt are not normal, the determination circuits 250*a* and 250*b* do not output the input drive data adt and bdt to the drive circuits 310*a* and 310*b*, but outputs the drive data adt and bdt determined to be normal most recently to the drive circuits 310*a* and 310*b*.

This improves the reliability of the drive data adt and bdt input to the drive circuits 310*a* and 310*b*, and improves the waveform accuracy of the drive signals COMA and COMB output by the drive circuits 310*a* and 310*b*. As a result, the driving accuracy of the piezoelectric element 60 driven by the drive signals COMA and COMB is improved, and the ejection accuracy of the ink ejected by driving the piezoelectric element 60 is further improved.

Furthermore, when the input drive data adt and bdt are not normal consecutively, the determination circuits 250*a* and 250*b* do not output the input drive data adt and bdt to the drive circuits 310*a* and 310*b*, but outputs the drive data adt and bdt for stopping the operation of the drive circuits 310*a* and 310*b* to the drive circuits 310*a* and 310*b*. This reduces the possibility that the drive circuits 310*a* and 310*b* may continue to malfunction.

Although the embodiments have been described above, the present disclosure is not limited to the embodiments, and can be implemented in various modes without departing from the gist of the disclosure. For example, the above embodiments can be appropriately combined.

The disclosure includes a configuration substantially same as the configuration described in the embodiments (for example, a configuration having the same function, method, and result, or a configuration having the same object and effect). Further, the disclosure includes a configuration in which a non-essential part of the configuration described in the embodiments is replaced. Further, the disclosure includes a configuration having the same functions and effects as the configuration described in the embodiments or a configuration capable of achieving the same object. The disclosure also includes a configuration in which a known technique is added to the configuration described in the embodiments.

The following contents are derived from the embodiments described above.

An aspect of a liquid ejection apparatus includes an ejection head including a drive element driven by a drive signal and ejecting a liquid by driving the drive element, an ejection control circuit including a drive circuit that outputs the drive signal based on a base drive signal including a plurality of pieces of drive data, a main control circuit that outputs an ejection control signal including the base drive signal to the ejection control circuit, and a cable that communicably couples the ejection control circuit and the main control circuit and through which the ejection control signal propagates, wherein the ejection control signal includes the base drive signal and a determination signal corresponding to the base drive signal.

According to the liquid ejection apparatus, the ejection control signal output by the main control circuit and input to the ejection control circuit including the drive circuit that outputs the drive signal based on the base drive signal including a plurality of pieces of drive data includes a base drive signal and a determination signal corresponding to the base drive signal, so that the ejection control circuit can determine, based on the base drive signal and the determination signal, whether the input ejection control signal is normal. This improves the accuracy of the drive signal output by the drive circuit based on the base drive signal including a plurality of pieces of drive data. As the accuracy of the drive signal is improved, the driving accuracy of the drive element driven by the drive signal is improved, and the ejection accuracy of the liquid ejected from the ejection head by driving the drive element is improved.

In an aspect of the liquid ejection apparatus, a length of the cable may be longer than a length of a propagation path through which the drive signal propagates from the ejection control circuit to the ejection head.

According to the liquid ejection apparatus, even when the length of the cable is longer than the length of the propagation path through which the drive signal propagates from the ejection control circuit to the ejection head, since the ejection control circuit can determine, based on the base drive signal and the determination signal, whether the input ejection control signal is normal, the accuracy of the drive signal output by the drive circuit based on the base drive signal including a plurality of pieces of drive data is improved, and the driving accuracy of the drive element driven by the drive signal is improved, and as a result, the ejection accuracy of the liquid ejected from the ejection head by driving the drive element head is improved.

In an aspect of the liquid ejection apparatus, the ejection control signal may be an optical signal, and wherein the cable may include an optical cable through which the optical signal propagates.

According to the liquid ejection apparatus, even when the ejection control signal is an optical signal and the cable includes an optical cable that propagates the optical signal, since the ejection control circuit can determine, based on the base drive signal and the determination signal, whether the input ejection control signal is normal, the accuracy of the drive signal output by the drive circuit based on the base drive signal including a plurality of pieces of drive data is improved, and the driving accuracy of the drive element driven by the drive signal is improved, and as a result, the ejection accuracy of the liquid ejected from the ejection head by driving the drive element head is improved.

In an aspect of the liquid ejection apparatus, the ejection control signal may serially include the base drive signal, the determination signal, and a print signal that specifies an amount of a liquid to be ejected from the ejection head.

According to the liquid ejection apparatus, when the ejection control signal serially includes the base drive signal, the determination signal, and the print signal that specifies the amount of a liquid to be ejected from the ejection head serially, it is possible to reduce the number of cables for communicably coupling the ejection control circuit and the main control circuit and, as a result, downsizing of the liquid ejection apparatus 1 can be achieved.

In an aspect of the liquid ejection apparatus, the ejection control circuit may include a determination circuit that determines, using the determination signal, whether the plurality of pieces of drive data is normal.

In an aspect of the liquid ejection apparatus, when the determination circuit determines that first drive data among the plurality of pieces of drive data is normal, the drive circuit may output the drive signal based on the first drive data.

In an aspect of the liquid ejection apparatus, when the determination circuit determines that second drive data subsequent to the first drive data among the plurality of pieces of drive data is not normal, the drive circuit may output the drive signal based on the first drive data.

According to the liquid ejection apparatus, when the determination circuit determines that the input drive data is normal, the drive circuit outputs a drive signal based on the input drive data, and when the determination circuit determines that the input drive data is not normal, the drive circuit outputs a drive signal based on the drive data determined to be normal most recently. That is, the possibility that the signal waveform of the drive signal output by the drive circuit is distorted due to unintended drive data input to the drive circuit is reduced. Therefore, the possibility that the driving accuracy of the drive element driven by the drive signal is lowered is reduced, and as a result, the possibility that the ejection accuracy of the liquid ejected from the ejection head by driving the drive element is lowered is reduced.

In an aspect of the liquid ejection apparatus, when the determination circuit determines that third drive data subsequent to the second drive data among the plurality of pieces of drive data is not normal, the drive circuit may stop outputting the drive signal, and the determination circuit may output anomaly information.

According to the head unit, when the determination circuit determines that the input drive data is not normal consecutively a plurality of times, the drive circuit stops outputting the drive signal. As a result, it is possible to reduce the possibility that unintended distortion occurs in the signal waveform of the drive signal output by the drive circuit, and as a result, unintended stress is continuously applied to the drive element to which the drive signal is supplied.

An aspect of the head unit includes an ejection head including a drive element driven by a drive signal and ejecting a liquid by driving the drive element, and an ejection control circuit including a drive circuit that outputs the drive signal based on a base drive signal including a plurality of pieces of drive data and to which an ejection control signal including the base drive signal is input, wherein the ejection control signal includes the base drive signal and a determination signal corresponding to the base drive signal.

According to the head unit, the ejection control signal input to the ejection control circuit including the drive circuit that outputs the drive signal based on the base drive signal including a plurality of pieces of drive data includes a base drive signal and a determination signal corresponding to the base drive signal, so that the ejection control circuit can determine, based on the base drive signal and the determination signal, whether the input ejection control signal is normal. This improves the accuracy of the drive signal output by the drive circuit based on the base drive signal including a plurality of pieces of drive data. As the accuracy of the drive signal is improved, the driving accuracy of the drive element driven by the drive signal is improved, and the ejection accuracy of the liquid ejected from the ejection head by driving the drive element is improved.

In an aspect of the head unit, the ejection control circuit may include a determination circuit that determines, using the determination signal, whether the plurality of pieces of drive data is normal.

In an aspect of the head unit, when the determination circuit determines that first drive data among the plurality of pieces of drive data is normal, the drive circuit may output the drive signal based on the first drive data.

In an aspect of the head unit, when the determination circuit determines that second drive data subsequent to the first drive data among the plurality of pieces of drive data is not normal, the drive circuit may output the drive signal based on the first drive data.

According to the head unit, when the determination circuit determines that the input drive data is normal, the drive circuit outputs a drive signal based on the input drive data, and when the determination circuit determines that the input drive data is not normal, the drive circuit outputs a drive signal based on the drive data determined to be normal most recently. That is, the possibility that the signal waveform of the drive signal output by the drive circuit is distorted due to unintended drive data input to the drive circuit is reduced. Therefore, the possibility that the driving accuracy of the drive element driven by the drive signal is lowered is reduced, and as a result, the possibility that the ejection accuracy of the liquid ejected from the ejection head by driving the drive element is lowered is reduced.

In an aspect of the head unit, when the determination circuit determines that third drive data subsequent to the second drive data among the plurality of pieces of drive data is not normal, the drive circuit may stop outputting the drive signal, and the determination circuit may output anomaly information.

According to the head unit, when the determination circuit determines that the input drive data is not normal consecutively a plurality of times, the drive circuit stops outputting the drive signal. As a result, it is possible to reduce the possibility that unintended distortion occurs in the signal waveform of the drive signal output by the drive circuit, and as a result, unintended stress is continuously applied to the drive element to which the drive signal is supplied.

In an aspect of the head unit, the ejection control signal may be an optical signal, and wherein the ejection control circuit may include a photoelectric conversion circuit that converts the optical signal into an electric signal.

According to the head unit, even when the ejection control signal is an optical signal, since the ejection control circuit can determine, based on the base drive signal and the determination signal, whether the input ejection control signal is normal, the accuracy of the drive signal output by the drive circuit based on the base drive signal including a plurality of pieces of drive data is improved, and the driving accuracy of the drive element driven by the drive signal is improved, and as a result, the ejection accuracy of the liquid ejected from the ejection head by driving the drive element head is improved.

In an aspect of the head unit, the ejection control circuit may include a deserializer.

What is claimed is:

1. A liquid ejection apparatus comprising:

an ejection head including a drive element driven by a drive signal and ejecting a liquid by driving the drive element;

an ejection control circuit including a drive circuit that outputs the drive signal based on a base drive signal including a plurality of pieces of drive data;

a main control circuit that outputs, to the ejection control circuit, an ejection control signal including the base drive signal and a determination signal corresponding to the base drive signal; and a cable that communicably couples the ejection control circuit and the main control circuit and through which the ejection control signal propagates, the ejection control circuit further including a determination circuit that determines, using the determination signal that the main control circuit has output through the cable, whether the plurality of pieces of drive data are normal.

2. The liquid ejection apparatus according to claim 1, wherein a length of the cable is longer than a length of a propagation path through which the drive signal propagates from the ejection control circuit to the ejection head.

3. The liquid ejection apparatus according to claim 1, wherein the ejection control signal is an optical signal, and wherein the cable includes an optical cable through which the optical signal propagates.

4. The liquid ejection apparatus according to claim 1, wherein the ejection control signal serially includes the base drive signal, the determination signal, and a print signal that specifies an amount of a liquid to be ejected from the ejection head.

5. The liquid ejection apparatus according to claim 1, wherein the determination signal includes checksum data corresponding to the base drive signal.

6. The liquid ejection apparatus according to claim 1, wherein the determination signal includes an authentication code.

7. The liquid ejection apparatus according to claim 1, wherein upon the determination circuit determining that first drive data among the plurality of pieces of drive data is normal, the drive circuit outputs the drive signal based on the first drive data.

8. The liquid ejection apparatus according to claim 7, wherein upon the determination circuit determining that second drive data subsequent to the first drive data among the plurality of pieces of drive data is not normal, the drive circuit outputs the drive signal based on the first drive data.

9. The liquid ejection apparatus according to claim 8, wherein upon the determination circuit determining that third drive data subsequent to the second drive data among the plurality of pieces of drive data is not normal, the drive circuit stops outputting the drive signal, and the determination circuit outputs anomaly information.

10. A head unit comprising:

an ejection head including a drive element driven by a drive signal and ejecting a liquid by driving the drive element; and an ejection control circuit which includes a drive circuit that outputs the drive signal based on a base drive signal including a plurality of pieces of drive data, and to which an ejection control signal including the base drive signal and a determination signal corresponding to the base drive signal is input through a cable, the ejection control circuit further including a determination circuit that determines, using the determination signal that is input through the cable to the ejection control circuit, whether the plurality of pieces of drive data are normal.

11. The head unit according to claim 10, wherein the ejection control signal is an optical signal, and wherein the ejection control circuit further includes a photoelectric conversion circuit that converts the optical signal into an electric signal.

12. The head unit according to claim 10, wherein the ejection control circuit further includes a deserializer.

13. The head unit according to claim 10, wherein upon the determination circuit determining that first drive data among the plurality of pieces of drive data is normal, the drive circuit outputs the drive signal based on the first drive data.

14. The head unit according to claim 13, wherein upon the determination circuit determining that second drive data subsequent to the first drive data among the plurality of pieces of drive data is not normal, the drive circuit outputs the drive signal based on the first drive data.

15. The head unit according to claim 14, wherein upon the determination circuit determining that third drive data subsequent to the second drive data among the plurality of pieces of drive data is not normal, the drive circuit stops outputting the drive signal, and the determination circuit outputs anomaly information.

* * * * *